United States Patent Office 3,507,866
Patented Apr. 21, 1970

---

3,507,866
1H - IMIDAZO[4,5-b]PYRAZIN - 2 - ONE AND PROCESSES FOR THEIR PREPARATION
James H. Jones, Blue Bell, and Edward J. Cragoe, Jr., Lansdale, Pa., assignors to Merck & Co., Inc., Rahway, N.J., a corporation of New Jersey
No Drawing. Continuation-in-part of application Ser. No. 659,042, Aug. 8, 1967. This application May 9, 1968, Ser. No. 728,033
The portion of the term of the patent subsequent to Aug. 12, 1986, has been disclaimed
Int. Cl. C07d 51/76
U.S. Cl. 260—250  24 Claims

ABSTRACT OF THE DISCLOSURE 1H-imidazo[4,5-b]pyrazin-2-ones are described which are substituted with an amino or substituted amino group in the pyrazine moiety and optionally substituted on one or more the remaining available positions. These compounds are prepared principally by diazotization of a 3-aminopyrazinoic acid hydrazide, followed by heating of the intermediate acid azide. Certain of the substituted compounds are prepared by standard substitution reactions on the preformed 1H-imidazo[4,5-b]pyrazin-2-ones. The products have utility in at least one of the following areas: as antihypertensive agents, mild diuretic and saluretic agents, bronchodilating agents, inhibitors of gastric acid secretion, central nervous system stimulants, and cardiac stimulants.

---

This application is a continuation-in-part of our copending United States application, Ser. No. 659,042, filed Aug. 8, 1967.

This invention relates to novel organic compounds and more specifically relates to novel 1H-imidazo[4,5-b]pyrazin-2-ones, and their preparation.

The 1H-imidazo[4,5-b]pyrazin-2-ones of this invention can be represented by the structural formula:

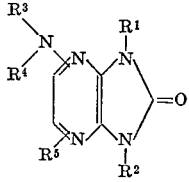

wherein
$R^1$ and $R^2$ represent
(a) hydrogen,
(b) lower alkylcarbonyl of from 2 to about 6 carbon atoms, e.g., acetyl, pripionyl, butyryl, pentanoyl, or hexanoyl, either straight, or branched chain,
(c) cycloalkyl, preferably lower cycloalkyl of from 3 to about 7 carbon atoms, e.g., cyclopropyl, cyclopentyl, cyclohexyl, cycloheptyl and the like,
(d) alkenyl, preferably lower alkenyl of from 3 to about 5 carbon atoms, e.g., allyl, propenyl, and the like,
(e) lower alkoxycarbonyl, wherein the lower alkoxy moiety, has from 1 to about 3 carbons e.g., methoxy, ethoxy and propoxy,
(f) alkyl, preferably lower alkyl of from 1 to about 5 carbon atoms, such as methyl, ethyl, propyl, butyl, and pentyl, either straight or branched chain, and either unsubstituted or substituted, such as with
(1) hydroxy,
(2) lower alkoxy, of from 1 to about 3 carbon atoms such as methyl, ethyl and propyl,
(3) heterocyclic group having 5 or 6 members, containing 1 or more hetero atoms selected from oxygen and/or nitrogen, e.g., morpholino, piperazino and the like,
(4) lower alkoxycarbonyl, wherein the lower alkoxy group has from 1 to about 3 carbons, e.g., methoxy, ethoxy, and propoxy,
(5) hydrazinocarbonyl, wherein the hydrazino group is either unsubstituted or substituted with such as lower alkyl of from 1 to about 3 carbons e.g., methyl, ethyl, or propyl, on either $N^1$ and/or $N^2$ of the hydrazine,
(6) mononuclear aryl, especially phenyl,
(7) amino, either unsubstituted or mono- or di-substituted with, advantageously lower alkyl group(s) having from 1 to 5 carbons which alkyls can be linked together directly or through an oxygen or nitrogen atom to form a heterocyclic group with nitrogen to which they are attached;

represents an unsubstituted or a substituted amino group
wherein
$R^4$ represents
(1) hydrogen,
(2) alkyl, preferably lower alkyl of from 1 to about 6 carbon atoms either straight or branched chain and either saturated or unsaturated, e.g., methyl, ethyl, propyl, isopropyl, allyl, propenyl, butyl, isobutyl, secondary butyl, pentyl, isopentyl, neopentyl, hexyl and the like, $R^3$ represents
(1) hydrogen,
(2) akenyl, preferably lower alkenyl of from 3 to about 5 carbon atoms, e.g., allyl, propenyl or the like,
(3) alkynyl, preferably lower alkynyl of from 3 to 5 carbon atoms, e.g., propargyl and the like,
(4) lower cycloalkyl of from 3 to about 7 carbon atoms e.g., cyclopropyl, cyclopentyl, cyclohexyl, cycloheptyl and the like,
(5) mononuclear aryl, especially phenyl, either unsubstituted or substituted, such as with halo, e.g., chloro, bromo, or fluoro, lower alkyl, of from 1 to about 3 carbon atoms e.g., methyl, ethyl, and propyl, or lower alkoxy, e.g., methoxy, ethoxy, propoxy, and the like,
(6) lower alkoxy, preferably lower alkoxy of from 1 to 4 carbon atoms, e.g., methoxy, ethoxy, isopropoxy and the like,
(7) amidino, either unsubstituted or substituted preferably with lower alkyl, or phenyl-lower alkyl.
(8) alkyl, preferably lower alkyl of from 1 to about 6 carbon atoms either straight or branched chain such as methyl, ethyl, propyl, isopropyl, butyl, isobutyl, secondary butyl, tertiary butyl, pentyl, isopentyl, neopentyl, hexyl, and the like, either unsubstituted or substituted with such as
(a) hydroxy,
(b) lower alkoxy of from 1 to about 3 carbon atoms, e.g., methoxy, ethoxy, propoxy and the like,
(c) lower cycloalkyl of from 3 to about 6 carbon atoms, e.g., cyclopropyl, cyclopentyl, cyclohexyl and the like, (d) ω,ω,ω,-trihalo, preferably trifluoro, (e) heterocyclic group of 5 or 6 nuclear members and containing one or more hetero atoms selected from oxygen and nitrogen, especially furyl and pyridyl, (f) mononuclear aryl, especially phenyl, either unsubstituted or substituted with such as halo, e.g., chloro, bromo, or fluoro, lower alkyl of from 1 to about 3 carbon atoms, e.g., methyl, ethyl, or propyl, or lower alkoxy of from 1 to about 3 carbon atoms, e.g., methoxy, ethoxy, propoxy and the like;

(g) 

Wherein $R^6$ represents (1) hydrogen, (2) alkyl, preferably lower alkyl of from 1 to about 5 carbon atoms, e.g., methyl, ethyl, propyl, isopropyl, butyl, isobutyl, secondary butyl, pentyl, isopentyl, neopentyl and the like, (3) lower alkylcarbonyl, of from 2 to about 3 carbons, e.g., acetyl, propionyl, and the like;

$R^7$ represents (1) hydrogen, (2) alkyl, preferably lower alkyl of from 1 to about 5 carbon atoms, e.g., methyl, ethyl, propyl, isopropyl, butyl, isobutyl, secondary butyl, pentyl, isopentyl, neopentyl, and the like;

$R^6$ and $R^7$ when lower alkyl can be linked together either directly or through a hereto atom such as nitrogen or oxygen to form a heterocyclic ring with the nitrogen to which they are attached, e.g., piperidino, pyrrolidynyl, morpholino, piperazinyl, N-lower alkyl piperazinyl, and the like;

$R^3$ and $R^4$ when lower alkyl can be linked together either directly or through a hetero atom such as nitrogen or oxygen to form a heterocyclic ring with the nitrogen atom to which they are attached forming, e.g., piperidino, pyrrolidynyl, morpholino, piperazinyl, N-lower alkylpiperazinyl, and the like, $R^3$ and $R^4$ when taken together represent $N_2$ thus forming with the nitrogen to which they are attached the azido group;

$R^5$ represents (a) hydrogen, (b) halo, e.g., chloro, or bromo, (c) alkyl, preferably lower alkyl of from 1 to about 6 carbon atoms, e.g., methyl, ethyl, propyl, isopropyl, butyl, isobutyl, secondary butyl, pentyl, isopentyl, neopentyl, and the like, (d) mononuclear aryl, especially phenyl, either unsubstituted or substituted with such as halo, e.g., chloro, bromo, or fluoro, lower alkyl of from 1 to about 3 carbon atoms, e.g., methyl, ethyl, or propyl, or lower alkoxy, e.g., methoxy, ethoxy, propoxy and the like.

The substituted 1H-imidazo[4,5-b]pyrazin-2-ones of this invention are orally active, relatively nontoxic, highly effective antihypertensive agents while retaining a moderate amount of diuretic and saluretic activity. In addition most of the novel products possess one or more additional pharmacological or therapeutic properties exhibiting (1) bronchodilator activity useful for the treatment of bronchial constriction such as asthmatic conditions, (2) gastric acid inhibiting activity useful in the treatment and prevention of ulcers, (3) central stimulating activity, useful in providing a mild stimulation, and (4) cardiac stimulating activity useful in the treatment of heart failure and related conditions.

The products of this invention can be administered in the form of pills, tablets, capsules, elixirs, injectable preparations, Aerosol preparations and the like and can comprise one or more of the compounds of this invention as the only essential active ingredient of the pharmaceutical formulation, or, the novel compound(s) can be combined in pharmaceutical formulations with other therapeutic agents. The compounds of this invention are advantageously administered at a dosage range of from about 5 mg./day to about 750 mg./day or at a somewhat higher or lower dosage preferably in subdivided amounts on a 2 to 4 times a day regimen.

It is recognized that the novel compounds of this invention are tautomeric in nature:

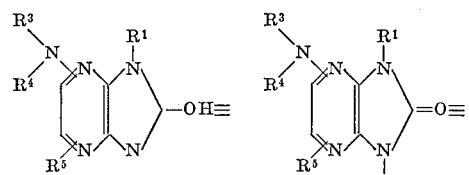

Ia        I

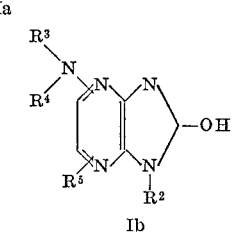

Ib

Such tautomerism is only possible wherein $R^1$ and/or $R^2$ is hydrogen. Although the 1H-imidazo[4,5-b]pyrazin-2-ol (Ia or Ib) might represent a significant or predominant form of a given compound, for the sake of consistency Structure I has been selected for purposes of this specification and named accordingly as 1H-imidazo[4,5-b]pyrazin-2-one.

The novel compounds of this invention can be prepared by several routes. The most general method is illustrated below:

Method A

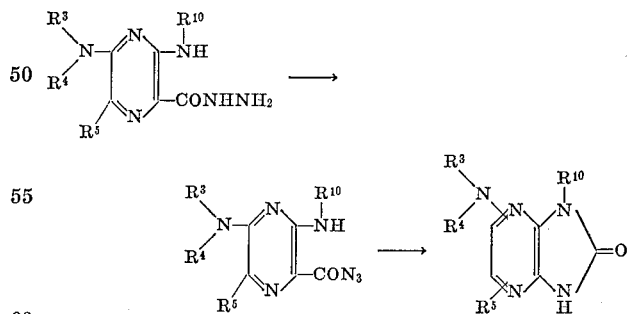

wherein $R^{10}$ represents hydrogen, lower alkyl, lower cycloalkyl, hydroxy-lower alkyl, lower(alkoxy-alkyl), lower alkenyl, and di(lower alky)amino-ower alkyl, wherein these groups have the scope defined for them in the definition of $R^1$.

In this case, a Curtis reaction or modification thereof is employed which involves diazotization of a 3-aminopyrazinoic acid hydrazide with an alkali metal nitrite in acid medium, which results in the formation of a pyrazinoic acid azide, which rearranges spontaneously when heated in a solvent to the required 1H-imidazo[4,5-b]pyrazin-2-one. The alkali metal nitrite, usually sodium or potassium nitrite in water is added slowly, preferably below the surface, to a stirred solution of the hydrazide in mineral acid, usually from about 0.5 N to 6 N hydrochloric acid, although sulfuric, hydrobromic or the like acid can be employed at a temperature from ambient to about steam bath temperature. The temperature employed is usually that required to dissolve the hydrazide. The intermediate acid azide precipitates from the reaction mixture, and because of its explosive nature is normally not purified or characterized, but simply collected by filtration, dried carefully and utilized in the next step.

The intermediate 3-aminopyrazinoic acid azide is dissolved in an alcoholic solvent such as methanol, ethanol, propanol, isopropanol, butanol or the like or for solubility reasons in a substituted alcohol such as 2-methoxyethanol, 2-ethoxyethanol or the like and heated on the steam bath for from 1 to 5 hours. Temperatures from about 50° C. to the reflux temperature of the solvent are satisfactory, the steam bath temperature being convenient. Similarly 1 to 5 hours is sufficient to complete the reaction, but longer periods such as overnight are not detrimental, if convenient. The product is isolated by evaporation of the solvent and recrystallization from a suitable solvent, or solvent mixtures.

In some cases, some of the substitutents $R^1$ and $R^2$ can be incorporated into the molecule of the preformed 1H-imidazo[4,5-b]pyrazin-2-one and are designated as $R^{11}$, wherein $R^{11}$ represents lower alkyl, lower alkoxycarbonyl-lower alkyl, lower alkoxycarbonyl, lower alkylcarbonyl, lower cycloalkyl, di(lower alkyl)amino-lower alkyl, and heterocyclic-lower alkyl such as morpholino-lower alkyl and piperazino-lower alkyl, wherein these groups have the scope defined for them in the definition of $R^2$. For example, if one or both imidazole nitrogens are unsubstituted, it, or they, can be acylated simply by refluxing the 1H-imidazo[4,5-b]pyrazin-2-one in an acid anhydride such as acetic anhydride, propionic anhydride or the like for 1 to 10 hours, preferably about 3 hours, followed by evaporation of the excess anhydride and recrystallization to provide a 1- (or 3-) or (1,3-di)-acyl-1H-imidazo[4,5-b]pyrazin-2-one.

Also, the unsubstituted nitrogens of the imidazo moiety are alkylated readily by dissolving the 1H-imidazo[4,5-b]pyrazin-2-one in an alkanol solution of an alkali metal alkoxide, and treating it with an excess of alkyl or cycloalkyl iodide or bromide such as methyl bromide or iodide or ethyl bromide or iodide or cyclopentyl bromide under reflux. Evaporation of the solvent yields a 1- (or 3-) or (1,3-di)-alkyl-1H-imidazo[4,5-b]pyrazin-2-one.

Similar alkylation is accomplished by the portion-wise addition of a dialkyl sulfate such as dimethyl sulfate to a solution of a 1H-imidazo[4,5-b]pyrazin-2-one in aqueous base such as sodium hydroxide or potassium hydroxide. The product, a 1- (or 3-) or (1,3-di)-alkyl-1H-imidazo[4,5-]pyrazin-2-one separates during the reaction and is collected and recrystallized from a suitable solvent.

Acylating or alkylating agents such as alkyl chloroformates and alkyl α-bromoalkanoates when added to a solution of a 1H-imidazo[4,5-b]pyrazin-2-one and an organic base such as a trialkylamine in a solvent such as a dialkylformamide or dialkylsulfoxide yields the desired 1H-imidazo[4,5-b]pyrazin-2-one having in the 1-, 3-, or 1,3-positions either alkoxycarbonyl groups such as ethoxycarbonyl or alkoxycarbonylalkyl groups such as ethoxycarbonylmethyl, respectively.

Treatment of esters of the latter type with hydrazine in an alkanol solution results in the formation of the corresponding hydrazides.

Another type of substitution on the 1, or 3, or the 1 and 3-nitrogens occurs upon stirring overnight at room temperature an aqueous solution of a 1H-imidazo[4,5-b]pyrazin-2-one with a secondary amine e.g., morpholine or piperidine, and formaldehyde. The 1-(or 3-) or (1,3-di)-aminomethyl derivative separates from the solution, is collected and recrystallized.

The above transformations are illustrated by the following reaction scheme:

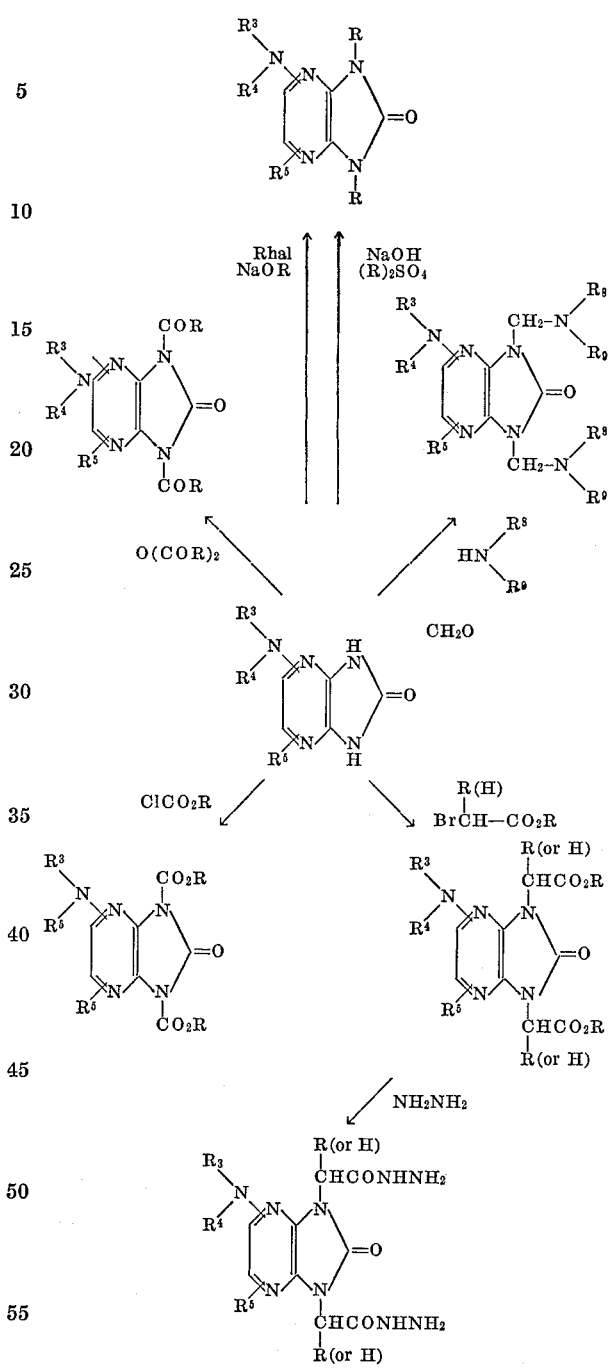

Method B wherein hal represents iodide or bromide, R represents lower-alkyl, and $R^8$ and $R^9$ represents lower alkyl of from 1 to 5 carbon atoms such as methyl, ethyl, propyl, butyl and pentyl, either straight or branched chain, or when taken together form a heterocyclic ring with the nitrogen to which they are attached such as morpholine, piperidine, piperazine, and the like. The above reaction schemes are intended as illustrative only, and although showing disubstitution in each case, it is understood that mono-substitution results if one of the imidazole nitrogens is previously substituted.

In addition to the substitutions described above some of the novel compounds of this invention are prepared by substitution in the 5(6)-position of the preformed 1H-imidazo[4,5-b]pyrazin-2-one. For example, the 5(6)-position can be halogenated by treating a 1H-imidazo[4,5-b]pyrazin-2-one with bromine or chlorine in an organic acid solution such as acetic acid, propionic acid or the like in the presence of an alkali metal alkanoate, such as sodium acetate and the like. The 5(6)-halo-1H-imidazo[4,5-b]pyrazin-2-one separates from the reaction mixture and is recrystallized from a suitable solvent.

If a halogen is present in the 6-position of a 1H-imidazo[4,5-b]pyrazin-2-one it can be removed by hydrogenalysis in the presence of a hydrogenation catalyst such as platinum, palladium or the like preferably palladium on carbon at hydrogen pressures of about 10–50 p.s.i.

Although many of the 3-amino-5-NR³R⁴-6-R⁵-pyrazinoic acid hydrazides used as starting materials in this invention are known, those that are not known are readily available by synthesis from known compounds.

I.
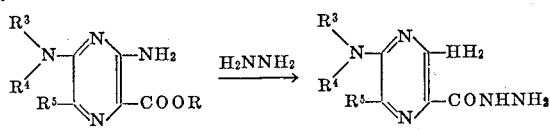

II.
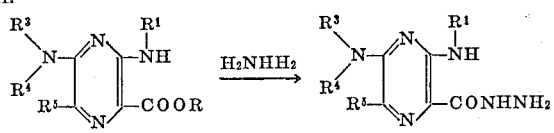

The intermediate esters are generally prepared by one of the three processes shown below:

III.
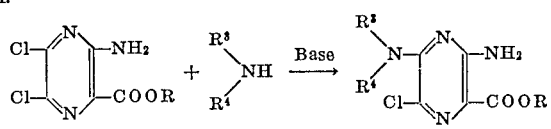

IV.
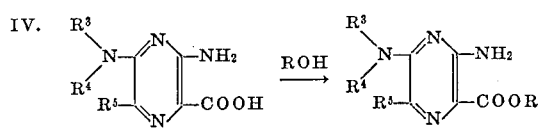

V.
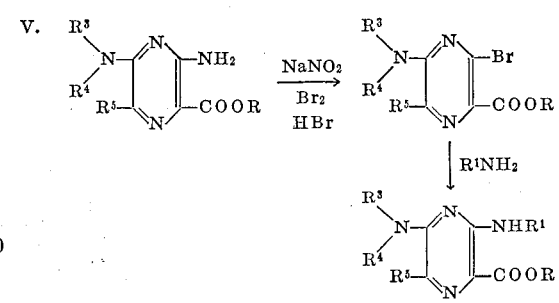

Specific examples are included wherein each of the above synthetic routes is described in detail.

(A) PREPARATION OF METHYL 3-AMINO-5-SUBSTITUTED-AMINO-6-CHLOROPYRAZINOATES

EXAMPLE 1

Methyl 3-amino-5-dimethylamino-6-chloropyrazinoate

A suspension of methyl 3-amino-5,6-dichloropyrazinoate (178 g., 0.8 mole) in 2-propanol (1.1 liters) is stirred while dimethylamine (200 g., 4.44 moles) in 2-propanol (2 liters) is added, and then the mixture is refluxed for an hour. The product that separates is removed by filtration and dried. The yield is 177.2 g. (97%). After recrystallization from methanol the methyl 3-amino-5-dimethylamino-6-chloropyrazinoate melts at 145.5–146.5° C.

*Analysis.*—Calculated for $C_8H_{11}ClN_4O_2$ (percent): C, 41.66; H, 4.81; N, 24.29. Found (percent): C, 41.73; H, 4.52; N, 24.24.

By employing substantially the same method as Example 1 but substituting for the dimethylamine, equimolar quantities of the amines identified in Table I there is obtained the corresponding methyl 3-amino-5-substituted-amino-6-chloropyrazinoate products identified in Table I according to Equation I.

TABLE I

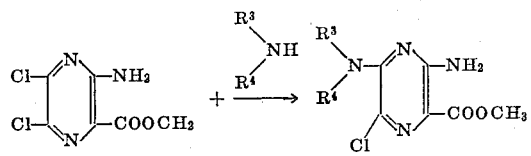

(Equation I)

| | | | | Analysis | | | | | |
|---|---|---|---|---|---|---|---|---|---|
| | | | | Calculated | | | Found | | |
| R³ | R⁴ | M.P., °C. | Formula | C | H | N | C | H | N |
| Example: | | | | | | | | | |
| 2 ____ CH≡C—CH₂— | H | 168–9 | $C_9H_9ClN_4O_2$ | 44.92 | 3.77 | 23.28 | 44.82 | 3.73 | 23.09 |
| 3 ____ CH₃OCH₂CH₂— | H | 142–44 | $C_9H_{13}N_4O_3Cl$ | 41.47 | 5.03 | 21.49 | 41.56 | 5.03 | 21.38 |
| 4 ____ (3-pyridyl)CH₂— | H | 190–191 | $C_{12}H_{12}ClN_5O_2$ | 49.07 | 4.12 | 23.85 | 49.39 | 4.06 | 23.88 |
| 5 ____ (2-pyridyl)CH₂— | H | 170–71 | $C_{12}H_{12}N_5O_2Cl$ | 49.07 | 4.12 | 23.85 | 49.36 | 4.18 | 23.61 |
| 6 ____ CH₃CONH(CH₂)₂— | H | 208–10 | $C_{10}H_{14}N_5O_3Cl$ | 41.75 | 4.90 | 24.34 | 42.04 | 4.85 | 24.69 |
| 7 ____ i-PrNH(CH₂)₃— | H | 125–7 | $C_{12}H_{20}N_5O_2Cl$ | 47.76 | 6.68 | 23.21 | 47.95 | 6.31 | 23.45 |
| 8 ____ CH₃CONH(CH₂)₃— | H | 180–182 | $C_{12}H_{10}N_5O_3Cl$ | 43.78 | 5.35 | ____ | 44.21 | 5.07 | ____ |
| 9 ____ (C₂H₅)₂NCH₂CH₂— | H | 114–16 | $C_{12}H_{20}N_5O_2Cl$ | 47.76 | 6.68 | 23.21 | 47.88 | 6.63 | 23.13 |
| 10 ____ (C₂H₅)₂NCH₂CHOHCH₂— | H | 174 dec. | $C_{13}H_{22}ClN_5O_3·2HCl$ | 38.58 | 5.98 | 17.31 | 38.97 | 5.88 | 17.12 |
| 11 ____ (CH₃)₂N₁₃—(CH₂)₂— | H | 108–09 | $C_{11}H_{18}N_5O_2Cl$ | 45.91 | 6.30 | 24.34 | 46.30 | 6.26 | 24.43 |
| 12 ____ (CH₃)₂N(CH₂)₄— | H | 170–171 | $C_{12}H_{20}ClN_5O_2·HCl$ | 42.61 | 6.20 | ____ | 42.40 | 5.67 | ____ |
| 13 ____ pyrrolidinyl-N—(CH₂)₂— | H | 121–22 | $C_{12}H_{18}N_5O_2Cl$ | 48.08 | 6.05 | 23.37 | 48.31 | 6.40 | 23.76 |

TABLE I—Continued

| | | | | | Analysis | | | | | |
|---|---|---|---|---|---|---|---|---|---|---|
| | | | | | Calculated | | | Found | | |
| $R^3$ | $R^4$ | M.P., °C. | Formula | | C | H | N | C | H | N |
| Example: | | | | | | | | | | |
| 14 .......... $CH_3N\phantom{xx}N(CH_2)_3$ | H | 148–49 | $C_{14}H_{23}N_6O_2Cl$ | | 49.05 | 6.76 | 24.52 | 48.95 | 6.64 | 24.50 |
| 15 .......... $O\phantom{xx}N(CH_2)_3-$ | H | 158–60 | $C_{13}H_{20}N_5O_3Cl$ | | 47.34 | 6.11 | 21.24 | 47.41 | 6.04 | 21.17 |
| 16 .......... $CH_3(CH_2)_2-$ | $CH_3$ | 83–5 | $C_{10}H_{15}N_4ClO_2$ | | 46.42 | 5.84 | 21.66 | 46.55 | 5.75 | 21.70 |
| 17 .......... $HOCH_2CH_2-$ | $CH_3$ | 175–178 | $C_9H_{13}N_4O_3Cl$ | | 41.47 | 5.03 | 21.49 | 41.90 | 5.18 | 21.21 |
| 18 .......... $-CH_2CH_2-\overset{C_2H_5}{\underset{|}{N}}-CH_2CH_2-$ | | 143–45 | $C_{12}H_{18}N_5O_2Cl$ | | 48.08 | 6.05 | 23.36 | 47.97 | 6.11 | 23.19 |
| 19 .......... $-CH_2CH_2O-CH_2CH_2-$ | | 197–8 | $C_{20}H_{13}N_4O_3Cl$ | | 44.04 | 4.80 | 20.55 | 44.32 | 4.74 | 20.67 |
| 20 .......... $\overset{CH_3}{\underset{|}{N}}(CH_2)_2$ $\underset{n-C_4H_9}{|}$ | H | 157–158 | $C_{17}H_{26}ClN_5O_6$(maleate) | | 47.28 | 6.07 | 16.22 | 47.43 | 6.06 | 16.52 |
| 21 .......... $(CH_3)_2N(CH_2)_3-$ | $CH_3-$ | 202–203 | $C_{12}H_{20}ClN_5O_2$(HCl) | | | | | | | |
| 22 .......... $(C_2H_5)_2N(CH_2)_2-$ | $CH_3-$ | 51–54 | $C_{13}H_{22}ClN_5O_2$ | | 42.61 | 6.26 | 20.71 | 42.51 | 6.09 | 21.02 |
| 23 .......... $=C-N(CH_3)_3$ $\underset{N(CH_3)_2}{|}$ | | 203–204 | $C_{11}H_{17}ClN_6O_2$ | | 49.44 | 7.02 | 22.18 | 49.65 | 6.67 | 22.30 |
| 24 .......... $-C-NHCOCH_3$ $\underset{NH}{\overset{||}{}}$ | H | 246–248 | $C_9H_{11}ClN_6O_3$ | | 43.93 | 5.69 | 27.94 | 43.85 | 5.54 | 28.17 |
| 25 .......... $CH_3-\overset{COCH_3}{\underset{|}{N}}-(CH_2)_2-$ | H | 175–179 | $C_{11}H_{16}ClN_5O_3$ | | 37.70 | 3.87 | 29.32 | 37.43 | 4.15 | 29.08 |

The following compounds also are prepared by the method described in Example 1 by replacing the dimethylamine with an equimolecular quantity of (Example 26) 2-(N-acetyl-N-ethylamino)ethylamine
(Example 27) 2-piperidinoethylamine
(Example 28) 3-piperidinopropylamine thereby forming:

Example 26 Methyl 3-amino-5-[2-(N-acetyl-N-ethylamino)ethylamino]-6-chloropyrazinoate,
Example 27 Methyl 3-amino-5-(2-piperidinoethylamino)-6-chloropyrazinoate and
Example 28 3-amino-5-(3-piperidinopropylamino)-6-chloropyrazinoate (B) PREPARATION OF METHYL 3-SUBSTITUTED-AMINOPYRAZINOATES

EXAMPLE 29

Methyl 3-(2-hydroxyethylamino)-5-dimethylamino-6-chloropyrazinoate

Step A: Preparation of methyl 3-bromo-5-dimethylamino-6-chloropyrazinoate.—A solution of 15 ml. of bromine in 30 ml. of acetic acid is added to a cooled (5° C.) suspension of methyl 3-amino-5-dimethylamino-6-chloropyrazinoate in 100 ml. of hydrobromic acid (48%) and 200 ml. of acetic acid. To this mixture at 5° C. is added a solution of sodium nitrite (17 g.) in 30 ml. of water and the mixture is stirred for 30 minutes. A solution of 45 g. of sodium bisulfite in 150 ml. of water is then added at 10° C. to destroy the excess bromine. At this point a solid separates which is filtered and dried and recrystallized from cyclohexane to give methyl 3-bromo-5-dimethylamino-6-chloropyrazinoate, M.P. 98–99° C.

Analysis.—Calculated for $C_8H_9N_3O_2BrCl$ (percent): C, 32.62; H, 3.08; N, 14.27. Found (percent): C, 33.16; H, 3.00; N, 14.18.

Step B: Preparation of methyl 3-(2-hydroxyethylamino)-5-dimethylamino-6-chloropyrazinoate.—A mixture of 11.8 g. of methyl 3-bromo-6-chloro-5-dimethylaminopyrazinoate, 4.88 g. of ethanolamine and 30 ml. of dimethyl sulfoxide is heated on the steam bath for 1½ hours. The solution is then poured into water and cooled whereupon yellow crystals separate. These are collected on a filter, washed and dried and recrystallized from butyl chloride to give methyl 3-(2-hydroxyethylamino)-5-dimethylamino-6-chloropyrazinoate, M.P. 103–105° C.

Analysis.—Calculated for $C_{10}H_{15}N_4O_3Cl$ (percent): C, 43.72; H, 5.50; N, 20.40. Found (percent): C, 43.66; H, 5.22; N, 20.39.

EXAMPLE 30

Preparation of methyl 2-ethylamino-5-dimethylamino-6-chloropyrazinoate

A solution of methyl 3-bromo-5-dimethylamino-6-chloropyrazinoate (11.8 g., 0.04 ml.) and 70% ethylamine (5.2 ml.) in dimethyl sulfoxide (30 ml.) is heated on the steam bath for 1½ hours and then water (100 ml.) is added which causes a solid to precipitate from the reaction. This solid is collected, dried, and recrystallized from cyclohexane to yield 9.6 g. (92%) of methyl 3-ethylamino-5-dimethylamino-6-chloropyrazinoate melting at 93–95° C.

Analysis.—Calculated for $C_{10}H_{15}N_4O_2Cl$ (percent): C, 46.42; H, 5.84; N, 21.66. Found (percent): C, 46.56; H, 5.83; N, 21.68.

EXAMPLE 31

Preparation of methyl 3-allylamino-5-ethylamino-6-chloropyrazinoate

Step A: Preparation of methyl 3-bromo-5-ethylamino-6-chloropyrazinoate.—By substituting an equimolar amount of methyl 3-amino-5-ethylamino-6-chloropyrazinoate for the methyl 3-amino-5-dimethylamino-6-chloropyrazinoate used in Example 29, Step A, and employing substantially the method described therein there is produced methyl 3-bromo-5-ethylamino-6-chloropyrazinoate. The pure compound is crystallized from benzene and melts at 160–162° C.

Analysis.—Calculated for $C_9H_9N_3O_2BrCl$ (percent): C, 32.62; H, 3.08; N, 14.27. Found (percent): C, 32.87; H, 2.89; N, 14.10.

Step B: Preparation of methyl 3-allylamino-5-ethylamino-6-chloropyrazinoate.—A solution of methyl 3-bromo-5-ethylamino-6-chloropyrazinoate (12.35 g., 0.042 mole) and allylamine (6.8 g., 0.12 mole) in dimethyl sulfoxide (30 ml.) is heated on the steam bath for 3 hours. Water (100 ml.) is added to the cooled reaction and the solid that separates is collected, dried, and recrystallized from 2-propanol to yield 5.9 g. (54%) of methyl 3-allylamino-5-ethylamino-6-chloropyrazinoate melting at 102–104° C.

*Analysis.*—Calculated for $C_{11}H_{15}N_4O_2Cl$ (percent): C, 48.80; H, 5.59; N, 20.70. Found (percent): C, 48.67; H, 5.49; N, 20.62.

EXAMPLE 32

Preparation of methyl 3-(2-hydroxyethylamino)-5-ethylamino-6-chloropyrazinoate

A solution of methyl 3-bromo-5-ethylamino-6-chloropyrazinoate (12.35 g., 0.042 mole) and ethanolamine (5.5 g., 0.09 mole) in dimethyl sulfoxide (30 ml.) is heated on the steam bath for 3 hours. Water (100 ml.) is added to the cooled reaction and the solid that separates is collected, dried, and recrystallized from butyl chloride to yield 3.6 g. (41%) of methyl 3-(2-hydroxyethylamino) - 5-ethylamino-6-chloropyrazinoate, melting at 111–112° C.

*Analysis.*—Calculated for $C_{10}H_{15}N_4O_3Cl$ (percent): C, 43.72; H, 5.50; N, 20.40. Found (percent): C, 43.22; H, 5.38; N, 20.93.

By employing substantially the method described in Example 32 but substituting for the ethanolamine an equimolar quantity of the amines identified in Table II there is produced the corresponding product esters identified in Table II according to Equation II.

5-dimethylamino-6-chloropyrazinoic acid hydrazide, M.P. 160–162° C.

*Analysis.*—Calculated for $C_9H_{15}N_6ClO_2$ (percent): C, 39.35; H, 5.50; N, 30.59. Found (percent): C, 39.55; H, 5.55; N, 30.32.

EXAMPLE 38

3-allylamino-5-ethylamino-6-chloropyrazinoic acid hydrazide

By substituting an equimolar amount of methyl 3-allylamino-5-ethylamino-6-chloropyrazinoate, from Example 31, for the methyl 3-ethylamino-5-dimethylamino-6-chloropyrazinoate used in Example 36 and employing substantially the method described therein there is produced 3-allylamino-5-ethylamino-6-chloropyrazinoic acid hydrazide, M.P. 152–154° C.

*Analysis.*—Calculated for $C_{10}H_{15}N_6OCl$ (percent): C, 44.36; H, 5.58; N, 31.05. Found (percent): C, 44.35; H, 5.44; N, 31.10.

EXAMPLE 39

3-(2-hydroxyethylamino)-5-ethylamino-6-chloropyrazinoic acid hydrazide

By substituting an equimolar amount of methyl 3-(2-hydroxyethylamino) - 5 - ethylamino - 6 - chloropyrazinoate, from Example 32, for the methyl 3-ethylamino-5-dimethylamino-6-chloropyrazinoate used in Example 36 and employing substantially the method described therein, there is produced 3-(2-hydroxyethylamino)-5-ethylamino-6-chloropyrazinoic acid hydrazide, melting point 155–157° C.

TABLE II

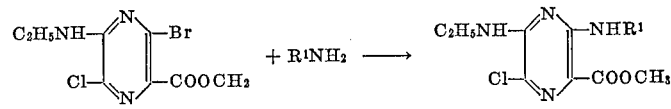

| Example | R¹ | M.P., °C. | Formula | Calculated C | H | N | Found C | H | N |
|---|---|---|---|---|---|---|---|---|---|
| 33 | CH₃ | 148–49 | $C_9H_{13}N_4O_2Cl$ | 44.18 | 5.35 | 22.90 | 44.44 | 5.13 | 22.78 |
| 34 | CH₃OCH₂CH₂— | 89–90 | $C_{11}H_{17}N_4O_3Cl$ | 45.75 | 5.94 | 19.14 | 45.93 | 5.72 | 19.23 |
| 35 | (CH₃)₂NCH₂CH₂— | 154–55 | $C_{12}H_{20}N_5O_2Cl$ | 47.76 | 6.68 | 23.21 | 48.08 | 6.48 | 23.35 |

(C) PREPARATION OF PYRAZINOIC ACID HYDRAZIDES

EXAMPLE 36

3-ethylamino-5-dimethylamino-6-chloropyrazinoic acid hydrazide

A solution of methyl 3-ethylamino-5-dimethylamino-6-chloropyrazinoate (9.0 g., 0.035 mole), from Example 30, and 64% hydrazine (15 ml.) in ethanol (100 ml.) is refluxed for 2 hours. Water (150 ml.) is added to the cooled reaction and the resulting solid is collected and dried to yield 8.8 g. (98%) of 3-ethylamino-5-dimethylamino-6-chloropyrazinoic acid hydrazide melting at 142–144° C.

*Analysis.*—Calculated for $C_9H_{15}N_6ClO$ (percent): C, 41.78; H, 5.84; N, 32.48. Found (percent): C, 41.78; H, 5.75; N, 32.19.

EXAMPLE 37

3-(2-hydroxyethylamino)-5-dimethylamino-6-chloropyrazinoic acid hydrazide

To a solution of methyl 3-(2-hydroxyethylamino)-5-dimethylamino-6-chloropyrazinoate (8.4 g., 0.03 mole), from Example 29, in ethanol (84 ml.) is added hydrazine (10 ml. of 64% aq.) and the reaction is refluxed for 3 hours. To the cooled solution is added water (100 ml.) and the solid that separates is recovered by filtration and dried to yield 7.0 g. (85%) of 3-(2-hydroxyethylamino)-

*Analysis.*—Calculated for $C_9H_{15}N_6O_2Cl$ (percent): C, 39.34; H, 5.50; N, 30.60. Found (percent): C, 39.48; H, 5.52; N, 30.67.

EXAMPLE 40

3-amino-5-guanidino-6-chloropyrazinoic acid hydrazide dihydrochloride

By substituting an equimolar amount of methyl 3-amino - 5 - (3 - acetylguanidino) - 6 - chloropyrazinoate, from Example 24, for the methyl 3-ethylamino-5-dimethylamino-6-chloropyrazinoate used in Example 36 and employing substantially the method described therein, there is produced 3-amino-5-guanidino-6-chloropyrazinoic acid hydrazide dihydrochloride, M.P. 270–272° C.

EXAMPLE 41

3-amino-5-diethylamino-6-chloropyrazinoic acid hydrazide

Hydrazine (20 ml. of 64% aqueous solution) is added to a solution of methyl 3-amino-5-diethylamino-6-chloropyrazinoate (10.0 g., 0.04 mole) in ethanol (250 ml.) and the reaction is refluxed for 4 hours. The solvent is then removed in vacuo and the residue washed out with water and dried to yield 9.0 g. (87%) of 3-amino-5-diethylamino-6-chloropyrazinoic acid hydrazide melting at 137–140° C. After crystallization from 2-propanol the compound melts at 142–145° C.

*Analysis.*—Calculated for $C_9H_{15}N_6ClO$ (percent): C, 41.79; H, 5.84; N, 32.49. Found (percent): C, 42.00; H, 6.05; N, 32.10.

By employing substantially the method described in Example 41 but substituting for methyl 3-amino-5-diethylamino-6-chloropyrazinoate equimolar quantities of the methyl pyrazinoates identified in Table III there is produced the corresponding pyrazinoic acid hydrazides, also identified in Table III for each of which physical constants are provided under "End Products," according to Equation III.

TABLE III

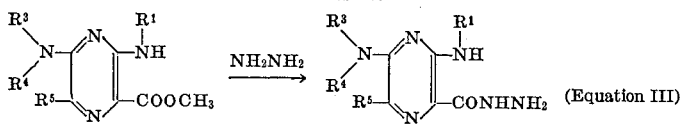   (Equation III)

| Ex. | Ester from Ex.① | R₁ | R₃\N\R₄ | R₅ | M.P., °C. | Formula | Calculated C | Calculated H | Calculated N | Found C | Found H | Found N |
|---|---|---|---|---|---|---|---|---|---|---|---|---|
| 42 | | H | $NH_2-$ | Cl | 60-1 | $C_5H_7ClN_6O$ | 29.64 | 3.48 | 41.38 | 30.18 | 3.44 | 41.16 |
| 43 | | H | $CH_3NH-$ | Cl | 257-60 | Compound not purified | | | | | | |
| 44 | | H | $C_2H_5NH-$ | Cl | 168-70 | $C_7H_{11}N_6ClO$ | 36.45 | 4.80 | 36.44 | 36.71 | 4.87 | 36.71 |
| 45 | | H | $n\text{-}C_3H_7NH-$ | Cl | 171-3 | $C_8H_{13}N_6ClO$ | 39.27 | 5.35 | 34.35 | 39.33 | 5.38 | 34.46 |
| 46 | | H | $CH_2=CHCH_2NH-$ | Cl | 158-60 | $C_8H_{11}N_6ClO$ | 39.59 | 4.57 | 34.63 | 39.66 | 4.77 | 34.65 |
| 47 | | H | $n\text{-}C_4H_9NH-$ | Cl | 162-5 | $C_9H_{15}N_6ClO$ | 41.78 | 5.84 | 32.49 | 42.10 | 6.01 | 32.63 |
| 48 | | H | $(CH_3)_2CHNH-$ | Cl | 132-4 | $C_8H_{13}N_6ClO$ | 39.27 | 5.36 | 34.35 | 39.00 | 5.50 | 34.35 |
| 49 | | H | $(CH_3)_3C-NH-$ | Cl | 192-3 | $C_9H_{15}ClN_6O$ | 41.78 | 5.84 | 32.49 | 41.44 | 5.65 | 32.47 |
| 50 | | H | cyclopentyl-NH- | Cl | 143-5 | $C_{10}H_{15}N_6ClO$ | 44.36 | 5.58 | 31.05 | 44.52 | 5.71 | 30.85 |
| 51 | | H | $HOCH_2CH_2NH$ | Cl | 184-5 | $C_7H_{11}N_6ClO_2$ | 34.08 | 4.50 | 34.07 | 34.31 | 4.59 | 34.38 |
| 52 | 3 | H | $CH_3OCH_2CH_2NH-$ | Cl | 151-3 | $C_8H_{11}ClN_6O_2$ | 36.86 | 5.03 | 32.24 | 36.92 | 4.83 | 32.18 |
| 53 | | H | $Cl\text{-}C_6H_4\text{-}CH_2NH-$ | Cl | 158-60 | $C_{12}H_{12}N_6ClO$ | 44.05 | 3.70 | 25.69 | 43.86 | 3.75 | 25.61 |
| 54 | 4 | H | 2-pyridyl-$CH_2NH-$ | Cl | 213-4 | $C_{11}H_{12}ClN_7O$ | 44.98 | 4.12 | 33.38 | 45.27 | 4.03 | 33.62 |
| 55 | 5 | H | 3-pyridyl-$CH_2NH-$ | Cl | 191-2 | $C_{11}H_{12}ClN_7O$ | 44.98 | 4.12 | 33.38 | 45.33 | 4.39 | 33.68 |
| 56 | | H | 4-pyridyl-$CH_2NH-$ | Cl | 208-10 | $C_{11}H_{12}ClN_7O$ | 44.98 | 4.12 | 33.38 | 45.34 | 4.24 | 33.70 |
| 57 | 6 | H | $CH_3C(O)-NH(CH_2)_2NH-$ | Cl | 245-8 | $C_9H_{14}ClN_7O_2$ | 37.57 | 4.90 | 34.08 | 37.77 | 4.93 | 34.37 |
| 58 | 7 | H | $(CH_3)_2CH-NH(CH_2)_2NH-$ | Cl | 163-65 | $C_{11}H_{20}ClN_7O$ | 43.78 | 6.68 | 32.49 | 43.77 | 6.62 | 32.72 |
| 59 | 8 | H | $CH_3CONH(CH_2)_3NH-$ | Cl | 220-1 | $C_{10}H_{16}ClN_7O$ | 39.80 | 5.35 | 32.50 | 40.06 | 5.37 | 32.40 |
| 60 | | H | $(CH_3)_2N-CH_2CH_2NH-$ | Cl | 161-3 | $C_9H_{16}N_7ClO$ | 39.49 | 5.89 | 35.82 | 39.86 | 5.94 | 36.04 |
| 61 | 9 | H | $(C_2H_5)_2N(CH_2)_2NH-$ | Cl | 95-7 | Compound not purified | | | | | | |
| 62 | 10 | H | $(C_2H_5)_2NCH_2CHOHCH_2NH-$ | Cl | 108-10 | $C_{12}H_{22}ClN_7O_2$ | 43.43 | 6.68 | 29.55 | 43.83 | 6.38 | 29.45 |
| 63 | 11 | H | $(CH_3)_2N(CH_2)_3NH-$ | Cl | 152-4 | $C_{10}H_{18}ClN_7O$ | 41.74 | 6.30 | 34.08 | 41.90 | 6.41 | 34.46 |
| 64 | 12 | H | $(CH_3)_2N(CH_2)_4NH-$ | Cl | 113-5 | $C_{11}H_{20}ClN_7O$ | 43.78 | 6.63 | 32.49 | 44.13 | 6.48 | 33.08 |
| 65 | 13 | H | pyrrolidinyl-$CH_2CH_2NH$ | Cl | 120-1 | $C_{11}H_{18}ClN_7O$ | 44.07 | 6.07 | 32.71 | 44.03 | 5.97 | 32.92 |
| 66 | 14 | H | $CH_3\text{-}N\text{-piperazinyl-}N-(CH_2)_3NH-$ | Cl | 167-9 | $C_{13}H_{23}ClN_8O$ | 45.54 | 6.76 | 32.69 | 45.50 | 6.73 | 32.48 |
| 67 | 15 | H | morpholinyl-$N-(CH_2)_3NH-$ | Cl | 183-4 | $C_{12}H_{20}ClN_7O_2$ | 43.70 | 6.11 | 29.73 | 44.24 | 6.17 | 29.00 |
| 68 | | H | phenyl-$NH-$ | Cl | 194-5 | $C_{11}H_{11}ClN_6O$ | 47.40 | 3.98 | 30.16 | 47.39 | 4.02 | 30.32 |

TABLE III—Continued

| Ex. | Ester from Ex.① | $R_1$ | $\begin{array}{c}R_3\\ \diagdown N\\ R_4 \diagup\end{array}$ | $R_5$ | M.P., °C. | Formula | Calculated C | H | N | Found C | H | N |
|---|---|---|---|---|---|---|---|---|---|---|---|---|
| 69 | 33 | $CH_3$ | $C_2H_5NH-$ | Cl | 189–91 | $C_8H_{13}ClN_6O$ | 39.27 | 5.35 | 34.35 | 39.35 | 5.01 | 34.68 |
| 70 | 34 | $\begin{array}{c}OCH_3\\ \mid\\ CH_2CH_2-\end{array}$ | $C_2H_5NH-$ | Cl | 149–51 | $C_{10}H_{17}ClN_6O$ | 41.59 | 5.94 | 29.11 | 41.54 | 5.82 | 29.28 |
| 71 | 35 | $\begin{array}{c}N(CH_3)_3\\ \mid\\ CH_2CH_2-\end{array}$ | $C_2H_5NH$ | Cl | 125 | $C_{11}H_{20}ClN_7O$ | 43.78 | 6.68 | 32.49 | 43.71 | 6.38 | 32.80 |
| 72 | 1 | H | $(CH_3)_2N-$ | Cl | 193–5 | $C_7H_{11}ClN_6O$ | 36.45 | 4.81 | 36.44 | 36.51 | 5.01 | 36.84 |
| 73 | | H | $\begin{array}{c}CH_3\\ \diagdown N-\\ CH_3\diagup\end{array}$ |  | 153–4 | $C_{13}H_{16}N_6O$ | 57.34 | 5.92 | 30.86 | 57.77 | 5.81 | 30.71 |
| 74 | | H | $\begin{array}{c}CH_3\\ \diagdown N-\\ C_2H_5\diagup\end{array}$ | Cl | 134–6 | $C_8H_{13}N_6ClO$ | 39.27 | 5.36 | 34.35 | 39.36 | 5.51 | 34.39 |
| 75 | 16 | H | $\begin{array}{c}CH_3\\ \diagdown N-\\ C_3H_7\diagup\end{array}$ | Cl | 133–6 | $C_9H_{15}ClN_6O$ | 41.78 | 5.84 | 32.49 | 41.92 | 5.84 | 32.31 |
| 76 | 17 | H | $\begin{array}{c}HOCH_2CH-N-\\ \mid\\ CH_3\end{array}$ | Cl | 228–30 | $C_8H_{13}ClN_6O_2$ | 36.86 | 5.03 | ...... | 36.80 | 4.22 | ...... |
| 77 | | H |  | Cl | 181–2 | $C_9H_{13}ClN_6O$ | 42.11 | 5.10 | 32.74 | 42.45 | 5.06 | 32.86 |
| 78 | | H |  | Cl | 189–90 | $C_{10}H_{16}ClN_7O$ | 27.59 | 3.71 | ...... | 28.11 | 3.62 | ...... |
| 79 | 18 | H |  | Cl | 168–70 | $C_{11}H_{18}ClN_7O$ | 44.07 | 6.05 | ...... | 44.20 | 5.66 | ...... |
| 80 | 19 | H |  | Cl | 190–92 | $C_9H_{13}ClN_6O_2$ | 39.64 | 4.80 | 30.82 | 39.43 | 4.57 | 30.64 |
| 81 | 20 | H | $\begin{array}{c}CH_3\\ \diagdown N(CH_2)_2NH\\ n\text{-}C_4H_9\diagup\end{array}$ | Cl | 88 | $C_{12}H_{22}ClN_7O$ | 45.63 | 7.02 | 31.05 | 45.72 | 6.73 | 31.43 |
| 82 | 21 | H | $\begin{array}{c}CH_3\\ (CH_3)_2N(CH_2)_2N-\end{array}$ | Cl | 77–78 | $C_{11}H_{20}ClN_7O$ | 43.78 | 6.68 | 32.49 | 43.94 | 6.50 | 32.45 |
| 83 | 22 | H | $\begin{array}{c}CH_3\\ (C_2H_5)_2N(CH_2)_2N-\end{array}$ | Cl | 116–117 | $C_{12}H_{22}ClN_7O$ | 45.63 | 7.02 | 31.05 | 45.42 | 6.77 | 31.36 |
| 84 | 23 | H | $(CH_3)_2N-C=N-$ $\phantom{(CH_3)_2N-C=}N(CH_3)_2$ | Cl | 220 | $C_{10}H_{17}ClN_8O$ | | | | | | |
| 85 | 25 | H | $\begin{array}{c}COCH_3\\ \mid\\ CH_3N-(CH_2)_2NH-\end{array}$ | Cl | 161–162 | $C_{10}H_{16}ClN_7O_2$ | 39.80 | 5.35 | 32.50 | 40.17 | 5.17 | 32.52 |

(Equation) (III)

| Ex. | Ester from Ex.① | $R_1$ | $\begin{array}{c}R_3\\ \diagdown N\\ R_4\diagup\end{array}$ | $R_5$ |
|---|---|---|---|---|
| Example: | | | | |
| 86 | | H | $H_2N-$ | Br |
| 87 | | H | $H_2N-$ | I |
| 88 | | H |  | Cl |
| 89 | 2 | H | $CH\equiv CCH_2NH$ | Cl |

| Ex. | Ester from Ex.① | $R_1$ | $\begin{array}{c}R_3\\ \diagdown N\\ R_4\diagup\end{array}$ | $R_5$ |
|---|---|---|---|---|
| Example: | | | | |
| 90 | | H | $-CH_2NH-$ | Cl |
| 91 | | H | $HOCH_2(CHOH)_4CH_2NH-$ | Cl |
| 92 | | H | $CF_3CH_2NH-$ | Cl |
| 93 | | H | $CF_3CH_2CH_2NH-$ | Cl |
| 94 | | H | $CH_3-$$-CH_2NH-$ | Cl |
| 95 | | H | $-CH_2CH_2NH-$ | Cl |

| Ester from Ex.① | R¹ | R³\N\R⁴ | R⁵ |
|---|---|---|---|
| Example: | | | |
| 96 | H | (furan)-CH₂NH— | Cl |
| 97 | 26 | H | C₂H₅N(CH₂)₂NH— / COCH₃ | Cl |
| 98 | 27 | H | (piperidine)N—(CH₂)₂NH— | Cl |
| 99 | 28 | H | (piperidine)N—(CH₂)₃NH— | Cl |
| 100 | | H | Cl—(phenyl)—NH— | Cl |
| 101 | | H | CH₃\N— / CH₃ | CH₃ |
| 102 | | H | CH₃\N— / CH₂=CH—CH₂ | Cl |
| 103 | | H | CH₃\N— / n—C₄H₉ | Cl |
| 104 | | H | CH₃(CH₃O)N— | Cl |

① Ester known unless otherwise noted.

(D) PREPARATION OF 1H-IMIDAZO[4,5-b]PYRAZIN-2-ONES

EXAMPLE 105

5-dimethylamino-6-chloro-1H-imidazo[4,5-b]pyrazin-2-one

To a stirred solution of 3-amino-5-dimethylamino-6-chloropyrazinoic acid hydrazide (15.0 g., 0.065 mole), from Example 72, in 0.5 N hydrochloric acid (150 ml.) is added a solution of sodium nitrite (4.5 g., 0.065 mole) in water (10 ml.). The addition is carried out at room temperature although higher temperatures, e.g., up to 45° C. or higher can be employed. The solid azide that separates during the addition is recovered by filtration and dried but not further purified.

The crude azide is dissolved in absolute ethanol (200 ml.) and heated at reflux for 20 hours. Other solvents can be employed, particularly 2-methoxyethanol, wherein ring closure takes place upon moderate heating, e.g., on steam bath, for about an hour. The solvent is removed in vacuo and the residue washed out with water to yield 4.8 g. (35%) of product melting at 214–217° C. dec.). After crystallization from a mixture of ethyl acetate and hexane the product melts at 216–217° C. (dec.).

*Analysis.*—Calculated for $C_7H_8N_5OCl$ (percent): C, 39.35; H, 3.77; N, 32.78. Found (percent): C, 39.82; H, 3.79; N, 32.30.

Employing essentially the same procedure as described in Example 105, but substituting for 3-amino-5-dimethylamin-6-chloropyrazinoic acid hydrazide, an equimolar amount of the hydrazides identified in Table IV, there is produced the corresponding 1H-imidazo[4,5-b]pyrazin-2-ones, identified in the table according to Equation IV.

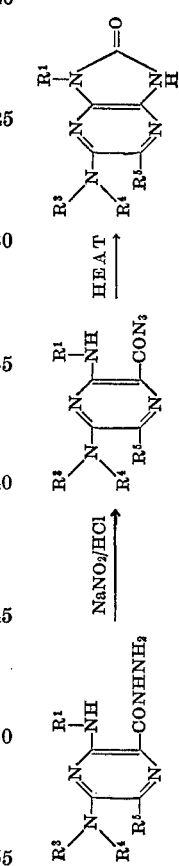

TABLE IV—(Equation IV)

| Hydrazide from Example | R¹ | R³\N\R⁴ | R⁵ | End Product | | | | | | |
|---|---|---|---|---|---|---|---|---|---|---|
| | | | | M.P., °C. | Formula | Calculated | | | Found | |
| | | | | | | C | H | N | C | H | N |
| Example: | | | | | | | | | | | |
| 106 | H | NH₂— | Cl | >300 | $C_5H_5N_5ClO$ | 32.36 | 2.17 | 37.74 | 32.64 | 2.22 | 37.36 |
| 107 | H | CH₃NH— | Cl | >280 | $C_6H_6N_5ClO$ | 36.10 | 3.03 | 35.09 | 36.39 | 3.21 | 35.12 |
| 108 | H | C₂H₅NH— | Cl | 248–9 | $C_7H_8N_5ClO$ | 39.35 | 3.77 | 32.78 | 39.45 | 3.89 | 33.11 |
| 109 | H | n-C₃H₇NH— | Cl | 215–16 | $C_8H_{10}N_5ClO$ | 42.20 | 4.43 | 30.77 | 39.62 | 4.62 | 33.89 |
| 110 | H | CH₂=CHCH₂NH— | Cl | 224–5 | $C_8H_8N_5ClO$ | 42.58 | 3.57 | 31.04 | 42.33 | 3.65 | 30.76 |
| 111 | H | n-C₄H₉NH— | Cl | 197–8 | $C_9H_{12}N_5ClO$ | 44.72 | 5.01 | 28.98 | 44.82 | 4.91 | 28.90 |
| 112 | H | CH₃\CHNH— / CH₃ | Cl | 247–9 | $C_8H_{10}N_5ClO$ | 42.12 | 4.43 | 30.76 | 41.93 | 4.46 | 30.41 |

TABLE IV (Equation IV)—Continued

| Hydrazide from Example | $R^1$ | $\begin{array}{c} R^3 \\ \diagdown N \diagup \\ R^4 \end{array}$ | $R^5$ | M.P., °C. | Formula | Analysis Calculated | | | Found | | |
|---|---|---|---|---|---|---|---|---|---|---|---|
| | | | | | | C | H | N | C | H | N |
| Example: 113 | H | $(CH_3)_3C-NH-$ | Cl | 235 | $C_9H_{12}N_5ClO$ | 44.72 | 5.01 | 28.98 | 44.92 | 5.09 | 28.96 |
| 114 | H | $\langle \rangle$—NH— | Cl | 256–7 | $C_{10}H_{12}N_5ClO$ | 47.34 | 4.77 | 27.61 | 47.56 | 4.98 | 27.67 |
| 115 | H | $HOCH_2CH_2NH-$ | Cl | 250–51 | $C_7H_8N_5ClO_2$ | 36.61 | 3.51 | 30.50 | 36.69 | 3.54 | 30.53 |
| 116 | H | $CH_3OCH_2CH_2NH-$ | Cl | 229–31 | $C_8H_{10}ClN_5O_2$ | 39.43 | 4.14 | 28.75 | 39.74 | 3.92 | 28.82 |
| 117 | H | —CH$_2$NH  | Cl | 270–1 | $C_{12}H_9N_5Cl_2O$ | 46.47 | 2.93 | 22.58 | 46.76 | 3.25 | 21.89 |
| 118 | H | —CH$_2$NH— | Cl | 280 | $C_{11}H_9ClN_6O\cdot HCl$ | 42.19 | 3.22 | 26.84 | 42.62 | 3.12 | 26.81 |
| 119 | H | —CH$_2$NH— | Cl | 271–2 | $C_{11}H_9ClN_6O-HCl\cdot H_2O$ | 39.89 | 3.65 | 25.38 | 40.12 | 3.86 | 25.72 |
| 120 | H | —CH$_2$NH— | Cl | 291–3(d.) | $C_7H_9ClN_6O\cdot HCl$ | 42.19 | 3.22 | 26.84 | 41.84 | 3.37 | 26.73 |
| 121 | H | $CH_3CNH(CH_2)_2NH-$ | Cl | 235–8(d.) | $C_9H_{11}ClN_6O_2$ | 39.93 | 4.09 | 31.05 | 40.02 | 4.23 | 30.92 |
| 122 | H | $CH_3CHNH(CH_2)_2NH-$ | Cl | 190–2 | $C_{10}H_{13}ClN_6O$ | 46.40 | 6.02 | — | 46.15 | 6.49 | — |
| 123 | H | $CH_3CONH(CH_2)_3NH-$ | Cl | 226–7 | $C_{10}H_{15}ClN_6O$ | 42.18 | 4.60 | 29.52 | 42.21 | 4.67 | 29.51 |
| 124 | H | $\begin{array}{c} CH_3 \\ \diagdown NCH_2NH- \\ \diagup \\ CH_3 \end{array}$ | Cl | 219–20 | $C_8H_{13}N_6ClO$ | 42.11 | 5.10 | 32.74 | 42.40 | 5.28 | 32.56 |
| 125 | H | $(C_2H_5)_2N(CH_2)_2NH-$ | Cl | 276–8(d.) | $C_{11}H_{18}Cl_2N_6O\cdot HCl$ | 41.13 | 5.65 | 26.16 | 41.05 | 5.64 | 25.95 |
| 126 | H | $(C_2H_5)_2NCH_2CHOHCH_2-NH-$ | Cl | 267–8 | $C_{12}H_{19}ClN_6O\cdot HCl$ | 41.03 | 5.74 | 23.93 | 41.29 | 5.78 | 23.57 |
| 127 | H | $(CH_3)_2N(CH_2)_3NH-$ | Cl | 188–90(d.) | $C_{14}H_{19}ClN_6O_5$ Maleate | 42.28 | 5.09 | 21.24 | 42.60 | 5.25 | 21.30 |
| 128 | H | $(CH_3)_2N(CH_2)_4NH-$ | Cl | 278–9 | $C_{11}H_{17}ClN_6O\cdot HCl$ | 41.13 | 5.65 | 26.17 | 41.29 | 5.53 | 26.43 |
| 129 | H | NCH$_2$CH$_2$NH— | Cl | 149–50 | $C_{11}H_{15}ClN_6O$ | 43.21 | 5.08 | 20.16 | 43.51 | 5.01 | 19.48 |
| 130 | H | $CH_3N\diagdown\diagup N(CH_2)_2NH-$  | Cl | 167–9(d.) | $C_{12}H_{20}ClN_7O$ | 47.92 | 6.19 | 30.10 | 47.97 | 6.29 | 30.01 |
| 131 | H | $O\diagdown\diagup N-(CH_2)_2NH-$  | Cl | 154–6(d.) | $C_{15}H_{21}ClN_6O_6$ Maleate 1/2 $H_2O$ | 43.81 | 5.07 | 12.20 | 43.86 | 5.27 | 10.16 |
| 132 | H | —NH  | C | 267(d.) | $C_{11}H_8N_5ClO$ | 50.49 | 3.08 | 26.77 | 50.87 | 3.59 | 26.70 |

TABLE IV (Equation IV)—Continued

| Example | Hydrazide from Example | $R^1$ | $R^3$ / $R^4$ | $R^2$ | M.P., °C. | Formula | Calculated C | Calculated H | Calculated N | Found C | Found H | Found N |
|---|---|---|---|---|---|---|---|---|---|---|---|---|
| 133 | 69 | $CH_3$ | $C_2H_5NH-$ | Cl | 248-9 | $C_8H_{10}ClN_5O$ | 42.20 | 4.43 | 30.77 | 42.22 | 4.53 | 30.40 |
| 134 | 39 | $HOCH_2CH_2-$ | $C_2H_5NH-$ | Cl | 213 | $C_9H_{14}N_5ClO_2$ | 41.95 | 4.70 | 27.18 | 42.12 | 4.69 | 26.91 |
| 135 | 70 | $CH_3OCH_2CH_3$ | $C_2H_5NH-$ | Cl | 205-7 | $C_{10}H_{14}ClN_5O$ | 44.20 | 5.19 | 25.78 | 44.32 | 5.02 | 25.50 |
| 136 | 38 | $CH_2=CHCH_2-$ | $C_2H_5NH-$ | Cl | 181-2 | $C_{10}H_{13}N_5ClO$ | 44.43 | 4.77 | 27.61 | 47.41 | 4.95 | 27.79 |
| 137 | 71 | $(CH_3)_2NCH_2CH_2-$ | $C_2H_5NH-$ | Cl | 184-5 | $C_{11}H_{17}ClN_5O·C_4H_5O_4$ | 44.94 | 5.28 | 20.97 | 45.41 | 5.16 | 20.81 |
| 138 | 73 | H | C₆H₅ (phenyl) | Cl | 281-2 | $C_{13}H_{13}N_5O$ | 61.16 | 5.13 | 27.44 | 61.66 | 5.25 | 27.37 |
| 139 | 41 | H | $N(CH_3)(C_2H_5)$ | Cl | 207-8 | $C_9H_{12}N_5ClO$ | 44.72 | 5.01 | 28.98 | 45.01 | 5.16 | 29.11 |
| 140 | 74 | H | $N(CH_3)_2$ | Cl | 203-5 | $C_8H_{10}N_5ClO$ | 42.21 | 4.43 | 30.76 | 42.48 | 4.68 | 30.86 |
| 141 | 75 | H | $N(CH_3)(n-C_3H_7)$ | Cl | 177-8 | $C_9H_{12}ClN_5O$ | 44.72 | 5.01 | 28.98 | 45.06 | 4.95 | 29.26 |
| 142 | 76 | H | $HO(CH_2)_2N(CH_3)$ | Cl | 188-90(d.) | $C_8H_{10}N_5ClO_2$ | 39.43 | 4.14 | 28.74 | 39.67 | 4.37 | 28.99 |
| 143 | 37 | $HOCH_2CH_2-$ | $N(CH_3)_2$ | Cl | 190 | $C_9H_{12}N_5ClO_2$ | 41.95 | 4.69 | 27.18 | 41.96 | 4.84 | 27.20 |
| 144 | 77 | H | pyrrolidinyl | Cl | 229(d.) | $C_9H_{10}ClN_5O$ | 45.10 | 4.21 | 29.22 | 45.46 | 4.42 | 28.91 |
| 145 | 78 | H | $N$-methylpiperazinyl | Cl | 275(d.) | $C_{10}H_{13}ClN_6O$ | 44.70 | 4.88 | 31.28 | 44.96 | 4.76 | 31.07 |
| 146 | 79 | H | $N$-ethylpiperazinyl | Cl | 307(d.) | $C_{11}H_{15}ClN_6O·HCl$ | 41.39 | 5.05 | 26.33 | 41.51 | 5.39 | 25.93 |
| 147 | 80 | H | morpholinyl | Cl | 272-3(d.) | $C_9H_{10}ClN_5O_2$ | 42.28 | 3.94 | 27.40 | 42.53 | 4.13 | 27.34 |
| 148 | 81 | H | $N(CH_3)(n-C_4H_9)N(CH_2)_2NH$ | Cl | 254-255 | $C_{12}H_{18}ClN_6O·HCl$ | 43.12 | 5.73 | 25.15 | 43.17 | 6.13 | 25.44 |

TABLE IV (Equation IV)—Continued

| Example | Hydrazide from Example | R¹ | R³ / R⁴ | R⁵ | M.P., °C. | Formula | Calculated C | Calculated H | Calculated N | Found C | Found H | Found N |
|---|---|---|---|---|---|---|---|---|---|---|---|---|
| 149 | 82 | H | (CH₃)₂N(CH₂)₂N(CH₃)— | Cl | 229–230 | C₁₁H₁₇ClN₆O·HCl·1/2H₂O | 40.03 | 5.68 | 25.72 | 40.01 | 5.80 | 25.45 |
| 150 | 83 | H | (C₂H₅)₂N(CH₂)₂N— | Cl | 244 | C₁₂H₁₉ClN₆O·HCl | 42.99 | 6.01 | 25.07 | 42.92 | 5.93 | 25.18 |
| 151 | 84 | H | (CH₃)₂N—C=N—N(CH₃)₂ | Cl | 285 | C₁₀H₁₄ClN₇O·HCl | 37.51 | 4.72 | 30.62 | 37.59 | 4.84 | 30.22 |
| 152 | 85 | H | CH₃N—(CH₂)₂NH— / COCH₃ | Cl | 227–228 | C₁₀H₁₃ClN₆O₂ | 42.18 | 4.60 | 29.52 | 42.42 | 4.56 | 29.26 |
| 153 | 40 | H | H₂N—C—NH— / =NH | Cl | >300 | C₆H₆ClN₇O·HCl | 27.29 | 2.67 | 37.13 | 27.20 | 2.63 | 37.20 |
| 154 | 86 | H | NH₂— | Br | | | | | | | | |
| 155 | 87 | H | NH₂— | I | | | | | | | | |
| 156 | 88 | H | ▷—NH— | Cl | | | | | | | | |
| 157 | 89 | H | CH≡C—CH₂NH— | Cl | | | | | | | | |
| 158 | 90 | H | ▷—CH₂NH— | Cl | | | | | | | | |
| 159 | 91 | H | HOCH₂(CHOH)₄CH₂NH— | Cl | | | | | | | | |
| 160 | 92 | H | CF₃CH₂NH— | Cl | | | | | | | | |
| 161 | 93 | H | CF₃CH₂CH₂NH— | Cl | | | | | | | | |
| 162 | 94 | H | CH₃—⟨phenyl⟩—CH₂NH— | Cl | | | | | | | | |
| 163 | 95 | H | ⟨phenyl⟩—CH₂CH₂NH— | Cl | | | | | | | | |
| 164 | 96 | H | ⟨furyl⟩—CH₂NH— | Cl | | | | | | | | |
| 165 | 97 | H | C₂H₅N(CH₂)₂NH— / COCH₃ | Cl | | | | | | | | |
| 166 | 98 | H | ⟨N-piperidyl⟩—(CH₂)₂NH— | Cl | | | | | | | | |

TABLE IV (Equation IV)—Continued

| Example: | Hydrazide from Example | $R_1$ | $\begin{array}{c}R_3\\\diagdown N\\\diagup\\R_4\end{array}$ | $R_5$ | M.P., °C. | Formula | Analysis Calculated C H N | Analysis Found C H N |
|---|---|---|---|---|---|---|---|---|
| 167 | 99 | H | $\begin{array}{c}\diagup\!\!\diagdown\\N\!\!-\!(CH_2)_3NH\!\!-\!\!\\\diagdown\!\!\diagup\end{array}$ | Cl | | | | |
| 168 | 100 | H | $Cl\!-\!\!\diagup\!\!\diagdown\!\!-\!NH\!\!-\!\!\\\diagdown\!\!\diagup$ | Cl | | | | |
| 169 | 101 | H | $\begin{array}{c}CH_3\\N\!\!-\!\!\\\diagup\\CH_3\end{array}$ | $CH_3$ | | | | |
| 170 | 102 | H | $\begin{array}{c}CH_3\\N\!\!-\!\!\\\diagup\\CH_2\!=\!CHCH_2\end{array}$ | Cl | | | | |
| 171 | 103 | H | $\begin{array}{c}CH_3\\N\!\!-\!\!\\\diagup\\n\text{-}C_4H_9\end{array}$ | Cl | | | | |
| 172 | 104 | H | $CH_3(CH_3O)N\!-\!$ | Cl | | | | |

EXAMPLE 173

5-ethylamino-1H-imidazo[4,5-b]pyrazin-2-one

A mixture of 5-ethylamino-6-chloro-1H-imidazo[4,5-b]pyrazin-2-one (2.1 g., 0.01 mole), 5% palladium on carbon catalyst (2.0 g.), and magnesium oxide (2.0 g.) in methanol (250 ml.) is placed in a pressure bottle and subjected to a hydrogen pressure of 30 p.s.i. until the theoretical amount of hydrogen is absorbed. The solution is then filtered, the filtrate is concentrated in vacuo and the resulting solid recovered to yield 0.8 g. (44%) of product melting 250–252° C. (dec.).

*Analysis.*—Calculated for $C_7H_9N_5O$ (percent): C, 46.92; H, 5.06. Found (percent): C, 46.77; H, 5.68.

EXAMPLE 174

5-ethylamino-6-bromo-1H-imidazo[4,5-b]pyrazin-2-one

Bromine (0.9 ml.) is added slowly to a solution of 3 g. of 5-ethylamino-1H-imidazo[4,5-b]pyrazin-2-one, from Example 173, and 4 g. of sodium acetate trihydrate in 20 ml. of acetic acid, while heating on the steam bath. When the bromine addition is complete the solid that separates is collected on a filter and recrystallized from ethanol-water to give 5-ethylamino-6-bromo-1H-imidazo[4,5-b]pyrazin-2-one.

EXAMPLE 175

5-(2-aminoethylamino)-6-chloro-1H-imidazo[4,5-b]pyrazin-2-one

5 - (2 - acetamidoethylamino) - 6 - chloro-1H-imidazo[4,5-b]pyrazin-2-one (1.0 g., 3.7 m. moles) from Example 121 is added to a stirred solution of 4 N hydrochloric acid (40 ml.), and the mixture is heated on the steam bath for 2 hours. On cooling, a solid separates, which is collected and dried to yield 0.8 g. of 5-(2-aminoethylamino)-6-chloro-1H-imidazo[4,5-b]pyrazin-2-one hydrochloride, M.P. >300° C.

*Analysis.*—Calculated for $C_7H_9ClN_6O$ (percent): C, 31.71; H, 3.80; N, 31.70. Found (percent): C, 31.62; H, 4.41; N, 31.52.

EXAMPLE 176

5-(2-methylaminoethylamino)-6-chloro-1H-imidazo[4,5-b]pyrazin-2-one

Following the procedure of Example 175 but substituting for the 5-(2-acetamidoethylamino)-6-chloro-1H-imidazo[4,5-b]pyrazin-2-one utilized therein, an equivalent amount of 5-[2-(N-methylacetamido)ethylamino]-6-chloro-1H-imidazo[4,5-b]pyrazin-2-one, from Example 152, there is produced 5-(2-methylaminoethylamino)-6-chloro-1H-imidazo[4,5-b]pyrazin-2-one hydrochloride, M.P. 236–237° C.

*Analysis.*—Calculated for $C_8H_{11}ClN_6O \cdot HCl$ (percent): C, 34.42; H, 4.33; N, 30.11. Found (percent): C, 34.94; H, 4.08; N, 29.85.

Utilizing the procedure substantially as described in Example 175 but substituting 5-[2-(N-ethylacetamido)ethylamino] - 6 - chloro-1H-imidazo[4,5-b]pyrazin-2-one, from Example 165, for the 5-(2-acetamidoethylamino)-6-chloro-1H-imidazo[4,5-b]pyrazin - 2 - one used therein, there is produced 5-(2-ethylaminoethylamino)-6-chloro-1H-imidazo[4,5-b]pyrazin-2-one.

EXAMPLE 177

1,3-bis(ethoxycarbonyl)-5-ethylamino-6-chloro-1H-imidazo[4,5-b]pyrazin-2-one

Ethyl chloroformate (2.2 g.) is added to a stirred solution of 2.1 g. of 5-ethylamino-6-chloro-1H-imidazo[4,5-b]pyrazin-2-one, 25 ml. of dimethylformamide and 1.4 ml. of triethylamine. After stirring for 30 minutes at room temperature the solution is poured into 100 ml. of water. The precipitated solid is collected, dried, recrystallized twice from acetonitrile to give 1,3-bis(ethoxycarbonyl) - 5 - ethylamino - 6 - chloro-1H-imidazo[4,5-b]pyrazin-2-one, M.P. 202–204° C.

*Analysis.*—Calculated for $C_{13}H_{16}ClN_5O_5$ (percent): C, 43.64; H, 4.51; N, 19.58. Found (percent): C, 43.98; H, 4.53; N, 19.61.

EXAMPLE 178

1,3-diacetyl-5-ethylamino-6-chloro-[H-imidazo[4,5-b]pyrazin-2-one

A solution of 2.13 g. of 5-ethylamino-6-chloro-1H-imidazo[4,5-b]pyrazin-2-one, from Example 108, in 30 ml. of acetic anhydride is refluxed for 3 hours. The solvent is evaporated and the residue is recrystallized from acetonitrile to give 1,3-diacetyl-5-ethylamino-6-chloro-1H-imidazo[4,5-b]pyrazin-2-one, melting point 198–200° C.

*Analysis.*—Calculated for $C_{11}H_{12}ClN_5O_3$ (percent): C, 44.38; H, 4.06; N, 23.53. Found (percent): C, 44.46; H, 4.21; N, 23.48.

EXAMPLE 179

1,3-bis(ethoxycarbonylmethyl)-5-ethylamino-6-chloro-1H-imidazo[4,5-b]pyrazin-2-one To a solution of 1.0 g. of 5-ethylamino-6-chloro-1H-imidazo[4,5-b]pyrazin-2-one, from Example 108, in 5 ml. dimethylformamide, 2.0 g. of triethylamine is added with stirring, followed by 1.67 g. of ethyl bromoacetate, and the mixture is stirred for 20 hours. After pouring into water the precipitate is collected and recrystallized from cyclohexane to give 1,3-bis(ethoxycarbonylmethyl)-5-ethylamino - 6 - chloro-1H-imidazo[4,5-b]pyrazin-2-one, M.P. 150–152° C.

*Analysis.*—Calculated for $C_{15}H_{20}ClN_5O_5$ (percent): C, 46.69; H, 5.22; N, 18.15. Found (percent): C, 46.62; H, 4.85; N, 17.71.

EXAMPLE 180

1,3-bis(hydrazinocarbonylmethyl)-5-ethylamino-6-chloro-1H-imidazo[4,5-b]pyrazin-2-one A mixture of 1.2 g. of 1,3-bis(ethoxycarbonylmethyl)-6 - chloro - 5 - ethylamino-1H-imidazo[4,5-b]pyrazin-2-one from Example 179, 2 ml. of 64% hydrazine and 50 ml. of ethanol is refluxed for two and one-half hours. The solid that separates on cooling is collected, dried and recrystallized from isopropanol to give 1,3-bis(hydrazinocarbonylmethyl) - 5 - ethylamino - 6-chloro-1H-imidazo-[4,5-b]pyrazin-2-one with melting point 250–253° C. (dec.).

*Analysis.*—Calculated for $C_{11}H_{10}ClN_9O_3$ (percent): C, 36.93; H, 4.51; N, 35.24. Found (percent): C, 37.04; H, 4.26; N, 35.14.

EXAMPLE 181

1,3-dimethyl-5-dimethylamino-6-chloro-1H-imidazo[4,5-b]pyrazin-2-one

A solution of 3 g. of 5-dimethylamino-6-chloro-1H-imidazo[4,5-b]pyrazin-2-one, from Example 105, in 30 ml. of water and 20 ml. of 5% sodium hydroxide is prepared, and to it is added portionwise 1.78 g. of dimethyl sulfate while stirring rapidly. The yellow solid that separates is filtered off and the filtrate is treated with more methyl sulfate in portions while adding more sodium hydroxide to keep the solution basic. A total of about 4 ml. of methyl sulfate is added. After the solid is collected it is recrystallized from cyclohexane twice to give 1,3-dimethyl - 5-dimethylamino-6-chloro-1H-imidazo[4,5-b]pyrazin-2-one, M.P. 158–60° C.

*Analysis.*—Calculated for $C_9H_{12}N_5OCl$ (percent): C, 44.73; H, 5.00; N, 28.98. Found (percent): C, 44.78; H, 4.96; N, 28.62.

EXAMPLE 182

1-ethyl-5-chloro-6-dimethylamino-1H-imidazo-[4,5-b]pyrazin-2-one

A solution of 8 g. of 3-ethylamino-5-dimethylamino-6-chloropyrazinoic acid hydrazide, from Example 36, in 15 ml. of 6 N hydrochloric acid is cooled to 10° C. in an ice bath and treated dropwise with a solution of 2.14 g. of sodium nitrite in 20 ml. of water with vigorous stirring. After about 45 minutes the precipitated solid is collected, washed with water and dried to give 7.8 g. of the acid azide, M.P. 110° C. (dec.).

The dry solid is suspended in 2-methoxyethanol and heated on the steam bath for 60 minutes. The solvent is removed by evaporation under reduced pressure and the residue is recrystallized from butyl chloride to give 1-ethyl-5-chloro-6-dimethylamino - 1H - imidazo[4,5-b]pyrazin-2-one, M.P. 175–178° C.

*Analysis.*—Calculated for $C_9H_{12}ClN_5O$ (percent): C, 44.73; H, 5.00; N, 28.98. Found (percent): C, 45.25; H, 5.05; N, 28.78.

EXAMPLE 183

1,3-bis(4-morpholinomethyl)-5-dimethylamino-6-chloro-1H-imidazo[4,5-b]pyrazin-2-one A solution of 2 g. of 5-dimethylamino-6-chloro-1H-imidazo[4,5-b]pyrazin-2-one, from Example 105, and 10 ml. of morpholine in 50 ml. of water is treated with 10 ml. of 37% aqueous formaldehyde at room temperature. The solution is stirred overnight. The precipitated product is collected and recrystallized from ethanol to give 1,3-bis(4-morpholinomethyl) - 5 - dimethylamino-6-chloro-1H-imidazo[4,5-b]pyrazin-2-one with melting point 126–128° C.

*Analysis.*—Calculated for $C_{17}H_{20}N_7O_3Cl$ (percent): C, 49.57; H, 6.36; N, 23.80. Found (percent): C, 49.76; H, 6.42; N, 23.90.

EXAMPLE 184

1,3-bis(piperidinomethyl)-5-dimethylamino-6-chloro-1H-imidazo[4,5-b]pyrazin-2-one By following the procedure described in Example 183, with the exception that the morpholine employed therein is replaced by an equivalent quantity of piperidine, there is produced 1,3-bis(piperidinomethyl)-5-dimethylamino-6-chloro-1H-imidazo[4,5-b]pyrazin-2-one.

EXAMPLE 185

1,3-dicyclopentyl-5-dimethylamino-6-chloro-1H-imidazo[4,5-b]pyrazin-2-one

5 - dimethylamino-6-chloro-1H-imidazo[4,5-b]pyrazin-2-one (10.65 g., 0.05 mole) is added to a solution of 1.17 g. (0.051 mole) of sodium in 100 ml. of methanol. Cyclopentyl bromide (7.5 g., 0.051 mole) is then added and the mixture is refluxed for one hour. Additional cyclopentyl bromide (7.5 g.) is added and the mixture is refluxed for two more hours. The solution is concentrated to dryness and the residue is crystallized from cyclohexane to give 1,3-dicyclopentyl-5-dimethylamino-6-chloro-1H-imidazo[4,5-b]pyrazin-2-one.

EXAMPLE 186

5-azido-6-chloro-1H-imidazo[4,5-b]pyrazin-2-one

Step A: 3-amino-5-hydrazino-6-chloropyrazinoic acid hydrazide.—A solution of methyl 3-amino-5,6-dichloropyrazinoate (11.1 g., 0.05 mole) in 2-methoxyethanol (100 ml.) and 64% hydrazine (50 ml.) is heated on a steam bath for 1½ hours. The reaction mixture is cooled to room temperature and the solid separates, is isolated by filtration and recrystallized from 2-ethoxyethanol to yield 8.0 g. (73%) of 3-amino-5-hydrazino-6-chloropyrazinoic acid hydrazide, M.P. 238–239° C. (dec.).

*Analysis.*—Calculated for $C_5H_8ClN_7O$ (percent): C, 27.60; H, 3.71. Found (percent): C, 28.00; H, 3.87.

Step B: 5-azido-6-chloro-1H-imidazo[4,5-b]pyrazin-2- one.—3-amino-5-hydrazino-6-chloropyrazinoic acid hydrazide (5.3 g., 0.024 mole) is dissolved in 5% hydrochloric acid (200 ml.) and a solution of sodium nitrite (3.36 g., 0.05 mole) in water (10 ml.) is added dropwise at room temperature. The solid that separates is recovered by filtration, dried, and then dissolved in 2-ethoxyethanol (100 ml.) and heated on the steam bath for 2 hours. The solvent is removed in vacuo and the residue is washed out with water and dried to yield 4.2 g. (81%) of product melting 188° C. dec.

Analysis.—Calculated for $C_5H_2N_7OCl$ (percent): C, 28.38; H, 0.95. Found (percent): C, 28.15; H, 0.98.

EXAMPLE 187

1-ethyl-3-(4-morpholinomethyl)-5-chloro-6-dimethylamino-1H-imidazo[4,5-b]pyrazin-2-one Employing the procedure essentially as described in Example 183 but substituting for the 5-dimethylamino-6-chloro-1H-imidazo[4,5-b]pyrazin-2-one used therein, equivalent amounts of 1-ethyl-5-chloro-6-dimethylamino-1H-imidazo[4,5-b]pyrazin-2-one from Example 182 there is produced 1-ethyl-3-(4-morpholinomethyl)-5-chloro-6-dimethylamino-1H-imidazo[4,5-b]pyrazin-2-one.

EXAMPLE 188

Dry filled capsule containing 50 mg. of active ingredient per capsule

|  | Mg. |
|---|---|
| 5-ethylamino - 6 - chloro-1H-imidazo[4,5-b]pyrazin-2-one (from Example 108) | 50 |
| Lactose | 275 |
| Mixed powders | 325 |

Mix the 5-ethylamino-6-chloro-1H-imidazo[4,5-b]pyrazin-2-one from Example 108, and lactose and reduce to a No. 60 mesh powder. Encapsulate, filling 325 mg. in each No. 2 capsule.

EXAMPLE 189

Inhalation Aerosol containing 0.1 mg. of 5-ethylamino-6-chloro-1H-imidazo[4,5-b]pyrazin-2-one

|  | Per container, grams | Per 150 containers, grams |
|---|---|---|
| 5-ethylamino-6-chloro-1H-imidazo[4,5-b]-pyrazin-2-one | 0.020 | 3.0 |
| Freon 11 | 0.530 | 79.5 |
| Freon 12/114 | 13.450 | 2,017.5 |

Procedure: A concentrate containing 3 gm. 5-ethylamino-6-chloro-1H-imidazo[4,5-b]pyrazin-2-one and 79.5 gm. Freon 11 (trichlorofluoromethane) in a 250 ml. capacity plastic coated bottle containing approximately 100 gm. of 6 mm. glass beads is roller milled for 48 hours to reduce the drug to a particle size of less than 10μ. A sufficient quantity of the milled concentrate (0.55 gm.) cooled to an appropriate temperature is transferred to each of the precooled containers. The required amount of Freon 12/114 (dichlorodifluoromethane/1,2 - dichloro-1,1,2,2-tetrafluoroethane is added and the container is sealed under pressure with a metering valve fitted with a plastic actuator and mouthpiece.

EXAMPLE 190

Inhalation Aerosol containing 0.5 mg. of 5-ethylamino-6-chloro-1H-imidazo[4,5-b]pyrazin-2-one

|  | Per container, grams | Per 150 containers, grams |
|---|---|---|
| 5-ethylamino-6-chloro-1H-imidazo[4,5-b]-pyrazin-2-one | 0.1 | 2.00 |
| Freon 11 | 0.5 | 10.00 |
| Ascorbic acid | 0.0035 | .070 |
| Anhydrous ethanol | 0.56 | 11.2 |
| Freon 12/114 | 14.00 | 280.00 |

Procedure: The drug is dispersed in the Freon 11 (trichlorofluoromethane), milled to the desired particle size in the manner described in Example 189 and subdivided into the individual containers. Sufficient Freon 12/114 (dichlorodifluoromethane/1,2-dichloro - 1,1,2,2 - tetrafluoroethane) is added to each container. The ascorbic acid dissolved in the anhydrous ethanol is likewise subdivided into individual containers. All operations are performed at an appropriately chosen temperature. Finally, the containers are sealed in the manner described in Example 187. Dosage forms containing from 0.2 to 1.0 mg. of active ingredient per spray can be prepared in a manner identical to that described above.

The above formulation employing more or less active ingredients or a combination of active ingredients can be employed to prepare capsules of the other novel compounds of this invention hereinbefore described.

While the invention has been described with particular reference to the preparation of representative novel 5-amino-(or substituted amino)-1H-imidazo[4,5-b]pyrazin-2-one compounds by representative procedures, it is to be understood that the invention embraces the other novel compounds that fall within the scope of the generic definition of the products of this invention all of which can be made by the illustrated procedures as well as by other synthetic routes that would be obvious to skilled chemists.

What is claimed is:

1. A process for the preparation of a compound of structural formula

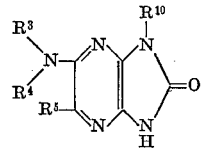

which comprises the reaction of a compound of structural formula

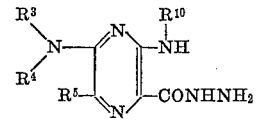

with alkali metal nitrite solution in acid followed by heating the resultant acid azide in alcohol solution wherein $R^{10}$ is a member selected from the group consisting of (a) hydrogen,
(b) lower alkyl,
(c) lower cycloalkyl,
(d) hydroxy-lower alkyl,
(e) lower(alkoxy-alkyl), and
(f) lower alkenyl;

represents an unsubstituted or a substituted amino group wherein:

$R^3$ is a member selected from the group consisting of (1) hydrogen,
(2) lower alkenyl,
(3) lower alkynyl,
(4) lower cycloalkyl,
(5) phenyl,
(6) halophenyl,
(7) lower alkoxy,
(8) amidino,
(9) lower alkyl-amidino,
(10) lower alkyl,
(11) hydroxy-lower alkyl,
(12) lower alkoxy-lower alkyl,
(13) lower cycloalkyl-lower alkyl,
(14) ω,ω,ω-trifluoro-lower alkyl,

(15) furfuryl,
(16) pyridylmethyl,
(17) phenyl-lower alkyl,
(18) lower alkyl-phenyl-lower alkyl,
(19) halophenyl-lower alkyl,

(20) 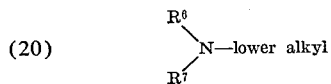

wherein:

$R^6$ is a member selected from the group consisting of (a) hydrogen,
(b) lower alkyl, and
(c) lower alkylcarbonyl;

$R^7$ is a member selected from the group consisting of (a) hydrogen, and
(b) lower alkyl, and $R^6$ and $R^7$ when lower alkyl can be linked together through a hetero atom to form, with the nitrogen atom to which they are attached, a heterocyclic ring selected from the group consisting of 4-lower alkylpiperazinyl and morpholino;

$R^6$ and $R^7$ when lower alkyl can be linked directly together to form, with the nitrogen atom to which they are attached a heterocyclic ring selected from the group consisting of piperidino and pyrrolidinyl;

$R^4$ is a member selected from the group consisting of (1) hydrogen, and
(2) lower alkyl;

$R^3$ and $R^4$ when lower alkyl can be linked together through a hetero atom to form, with the nitrogen atom to which they are attached, a heterocyclic ring selected from the group consisting of 4-lower alkyl-piperazinyl, and morpholino;

$R^3$ and $R^4$ when lower alkyl can be linked together directly to form, with the nitrogen atom to which they are attached a heterocyclic ring selected from the group consisting of piperidino and pyrrolidinyl, and $R^3$ and $R^4$ combined represent $N_2$;

$R^5$ is a member selected from the group consisting of (a) hydrogen,
(b) halo,
(c) lower alkyl, and
(d) phenyl.

2. A compound of structural formula

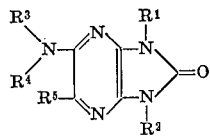

wherein $R^1$ and $R^2$ each represents a member selected from the group consisting of (a) hydrogen,
(b) lower alkylcarbonyl,
(c) lower cycloalkyl,
(d) lower alkenyl,
(e) lower alkoxycarbonyl,
(f) lower alkyl,
(g) hydroxy-lower alkyl,
(h) lower alkoxy-lower alkyl,
(i) morpholino-lower alkyl,
(j) piperazinyl-lower alkyl,
(k) lower alkoxycarbonyl-lower alkyl,
(l) hydrazinocarbonyl-lower alkyl,
(m) phenyl, and
(n) amino;

$R^3$ is a member selected from the group consisting of (1) hydrogen,
(2) lower alkenyl,
(3) lower alkynyl,
(4) lower cycloalkyl,
(5) phenyl,
(6) halophenyl,
(7) lower alkoxy,
(8) amidino,
(9) lower alkyl-amidino,
(10) lower alkyl,
(11) hydroxy-lower alkyl,
(12) lower alkoxy-lower alkyl,
(13) lower cycloalkyl-lower alkyl,
(14) ω,ω,ω-trifluoro-lower alkyl,
(15) furfuryl,
(16) pyridylmethyl,
(17) phenyl-lower alkyl,
(18) lower alkyl-phenyl-lower alkyl,
(19) halophenyl-lower alkyl,

(20) 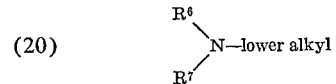

wherein $R^6$ is a member selected from the group consisting of (a) hydrogen,
(b) lower alkyl, and
(c) lower alkylcarbonyl, $R^7$ is a member selected from the group consisting of (a) hydrogen, and
(b) lower alkyl, $R^6$ and $R^7$ when lower alkyl can be linked together through a hetero atom to form, with the nitrogen atom to which they are attached, a heterocyclic ring selected from the group consisting of 4-lower alkyl-piperazinyl and morpholino, $R^6$ and $R^7$, when lower alkyl, can be linked directly together to form, with the nitrogen atom to which they are attached a heterocyclic ring selected from the group consisting of piperidino and pyrrolidinyl, $R^3$ and $R^4$ when lower alkyl can be linked together through a hetero atom to form, with the nitrogen atom to which they are attached, a heterocyclic ring selected from the group consisting of piperazinyl, 4-lower alkyl-piperazinyl, and morpholino, $R^3$ and $R^4$ when lower alkyl can be linked together directly to form, with the nitrogen atom to which they are attached a heterocyclic ring selected from the group consisting of piperidino and pyrrolidinyl, $R^3$ and $R^4$ combined represent $N_2$;

$R^4$ is a member selected from the group consisting of (1) hydrogen, and
(2) lower alkyl;

$R^5$ is a member selected from the group consisting of (a) hydrogen,
(b) halo,
(c) lower alkyl, and
(d) phenyl.

3. A compound as claimed in claim 2, wherein $R^1$ and $R^2$ are hydrogen, $R^5$ is halogen, and $R^3$ and $R^4$ have the meanings assigned to them in claim 2.

4. A compound as claimed in claim 2, wherein $R^1$ and $R^2$ are hydrogen, $R^5$ is halogen, $R^4$ is lower alkyl

wherein $R^6$ and $R^7$ have the meanings assigned to them in claim 2, and $R^3$ is hydrogen.

5. A compound as claimed in claim 2, wherein $R^1$ and $R^2$ are hydrogen, $R^5$ is chloro, and $R^3$ and $R^4$ have the meaning assigned to each of them in claim 2.

6. 5 - lower alkylamino-6-halo-1H-imidazo[4,5-b]pyrazin-2-one.

7. 5 - methylamino-6-halo-1H-imidazo[4,5-b]pyrazin-2-one.

8. 5 - ethylamino-6-chloro-1H-imidazo[4,5-b]pyrazin-2-one.

9. 5-propylamino-6-chloro-1H-imidazo[4,5-b]pyrazin-2-one.

10. 5 - isopropylamino-6-chloro-1H-imidazo[4,5 - b]pyrazin-2-one.

11. 5-butylamino-6-chloro,1H-imidazo[4,5-b]pyrazin-2-one.

12. 5-di(lower alkylamino)-6-chloro-1H-imidazo[4,5-b]pyrazin-2-one.

13. 5 - dimethylamino-6-chloro-1H-imidazo[4,5-b]pyrazin-2-one.

14. 5-diethylamino-6-chloro-1H-imidazo[4,5-b]pyrazin-2-one.

15. 5-lower cycloalkylamino-6-halo-1H-imidazo[4,5-b]pyrazin-2-one.

16. 5 - cyclopentylamino - 6 - chloro-1H-imidazo[4,5-b]pyrazin-2-one.

17. 5-(amino - lower alkylamino)-6-chloro-1H-imidazo[4,5-b]pyrazin-2-one.

18. 5-(2-aminoethylamino)-6-chloro-1H-imidazo[4,5-b]pyrazin-2-one.

19. 5-(2-ethylaminoethylamino)-6-chloro - 1H - imidazo[4,5-b]pyrazin-2-one.

20. 5 - (2-dimethylaminoethylamino)-6-chloro-1H-imidazo[4,5-b]pyrazin-2-one.

21. 5-(2-diethylaminoethylamino)-6-chloro-1H-imidazo[4,5-b]pyrazin-2-one.

22. 5-[2-(1-pyrrolidinyl)ethylamino]-6-chloro-1H-imidazo[4,5-b]pyrazin-2-one.

23. 5-(3 - dimethylaminopropylamino)-6-chloro-1H-imidazo[4,5-b]pyrazin-2-one.

24. 5-guanidino-6-chloro-1H-imidazo[4,5 - b]pyrazin-2-one.

No references cited.

NICHOLAS S. RIZZO, Primary Examiner

U.S. Cl. X.R.

260—247.2; 424—250

PO-1050
(5/69)

UNITED STATES PATENT OFFICE
CERTIFICATE OF CORRECTION

Patent No. 3,507,866          Dated April 21, 1970

Inventor(s) James H. Jones and Edward J. Cragoe, Jr.

It is certified that error appears in the above-identified patent and that said Letters Patent are hereby corrected as shown below:

Page 1 of 3

In column 1, line 19, the word "of" is missing between "more" and "the";

In column 4, line 64, the word "di(lower alky)amino-lower" should be --di(lower alkyl)amino-lower--;

In column 4, line 67, the word "Curtis" should be --Curtius--;

In column 6, in Method B between lines 15 and 20, that portion of the formula reading $\begin{smallmatrix}R^3\\R^4\end{smallmatrix}\!\!>\!\!N$ should not be connected to the 5-position;

In column 6, line 40, that portion of the formula reading "$\begin{smallmatrix}R^3\\R^5\end{smallmatrix}\!\!>\!\!N$" should be --$\begin{smallmatrix}R^3\\R^4\end{smallmatrix}\!\!>\!\!N$--;

In column 7, line 12, the word "statring" should be --starting--;

In column 7, line 17, that portion of the formula reading "-HH$_2$" should be --NH$_2$--;

In column 7, line 25, over the arrow "H$_2$NHH$_2$" should be --H$_2$NNH$_2$--;

In the heading in Table I, "COOCH$_2$" should be --COOCH$_3$--;

In Table I, in the column under R$^3$, example 11, "(CH$_3$)$_2$N$_{13}$-(CH$_2$)$_2$-" should be --(CH$_3$)$_2$N-(CH$_2$)$_3$--;

In Table I between Column R$^3$ and R$^4$, Example 23, "=C-N(CH$_3$)$_3$" should be -- =C-N(CH$_3$)$_2$ --;
   |                          |
N(CH$_3$)$_2$                N(CH$_3$)$_2$ In Table I, in the column under Formula, example 5, "O$_{12}$H$_{12}$N$_5$O$_2$Cl" should be --C$_{12}$H$_{12}$N$_5$O$_2$Cl--;

In Table I, in the column under Formula, example 8, "C$_{12}$H$_{10}$N$_5$O$_3$Cl" should be --C$_{11}$H$_{10}$N$_5$O$_3$Cl--;

In Table I, in the column under Formula, example 19, "C$_{20}$H$_{13}$N$_4$O$_3$Cl" should be --C$_{10}$H$_{13}$N$_4$O$_3$Cl--;

In Table I, in examples 22 through 25, the analytical results should be moved up one line to refer to examples 21-24;

PO-1050
(5/69)

UNITED STATES PATENT OFFICE
CERTIFICATE OF CORRECTION

Patent No. 3,507,866                    Dated April 21, 1970

Inventor(s)  James H. Jones and Edward J. Cragoe, Jr.

It is certified that error appears in the above-identified patent and that said Letters Patent are hereby corrected as shown below:

Page 2 of 3

In Column 9, line 45, example 28, the name should be prefixed by "methyl";

In Column 10, line 42, "2-ethylamino" should be --3-ethylamino--;

In the heading of Table II, "COOCH$_2$" should be --COOCH$_3$--;

In Table III, under the column $R^3{\diagdown}N, R^4{\diagup}$ example 76, "HOCH$_2$CH-N-" should be --HOCH$_2$CH$_2$-N- --;
             |                              |
             CH$_3$                         CH$_3$ In Table III, under the column $R^3{\diagdown}N, R^4{\diagup}$ example 81, that portion of the formula reading " ${\diagdown}N\diagup$ " should be -- ${\diagdown}N\diagup$ --;
                                  n-C$_4$H$_9$            n-C$_4$H$_9$ In Table III, under column M.P. °C., example 42, "60-1" should be --260-1--;

In Table III, under column Formula, example 66, "C$_{13}$H$_{23}$ClN$_6$O" should be --C$_{13}$H$_{23}$ClN$_8$O--;

In Table III, under column Analysis, example 42, "41.38" should be --41.48--, and "41.16" should be --41.61--;

In Table III, under column Analysis, example 85, "32.52" should be --32.25--;

In Column 17, line 72, "amin-6" should be --amino-6--;

In Table IV, example 112, under column Analysis, "42.12" should be --42.21--;

In Table IV, example 120, under column Formula, "C$^1$$_1$H$_9$Cl$_6$O$_2$HCl" should be --C$_{11}$H$_9$ClN$_6$O$_2$HCl--;

In Column 27, example 178, "-[H-imidazo" should be -- -[1H-imidazo--;

In Column 30, line 10, "Example 187" should be --Example 189--;

UNITED STATES PATENT OFFICE
CERTIFICATE OF CORRECTION

Patent No. 3,507,866      Dated April 21, 1970

Inventor(s) James H. Jones and Edward J. Cragoe, Jr.

It is certified that error appears in the above-identified patent and that said Letters Patent are hereby corrected as shown below:

Page 3 of 3

In Table IV, example 129, under column Formula, "$C_{11}H_{15}ClN_6O$" should be --$C_{11}H_{15}ClN_6O$ maleate $H_2O$--; and

SIGNED AND SEALED
OCT 6 - 1970

(SEAL)
Attest:

Edward M. Fletcher, Jr.
Attesting Officer

WILLIAM E. SCHUYLER, JR.
Commissioner of Patents